US012610950B2

(12) United States Patent
Queck, Jr. et al.

(10) Patent No.: US 12,610,950 B2
(45) **Date of Patent: *Apr. 28, 2026**

(54) METHOD FOR WEED CONTROL IN LAWN OR TURF

(71) Applicant: Discovery Purchaser Corporation, Wilmington, DE (US)

(72) Inventors: Thomas James Queck, Jr., Raleigh, NC (US); Bruce Spesard, Wake Forest, NC (US)

(73) Assignee: Discovery Purchaser Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/297,675

(22) Filed: Aug. 12, 2025

(65) Prior Publication Data

US 2025/0359550 A1 Nov. 27, 2025

Related U.S. Application Data

(63) Continuation of application No. 18/563,808, filed as application No. PCT/US2022/030640 on May 24, 2022.

(60) Provisional application No. 63/192,902, filed on May 25, 2021.

(51) Int. Cl.

*A01N 43/80* (2006.01)
*A01N 25/32* (2006.01)
*A01P 13/00* (2006.01)

(52) U.S. Cl.

CPC ............. *A01N 43/80* (2013.01); *A01N 25/32* (2013.01); *A01P 13/00* (2021.08)

(58) Field of Classification Search

CPC .......... A01N 43/80; A01N 25/32; A01P 13/00
See application file for complete search history.

(56) References Cited

U.S. PATENT DOCUMENTS

2017/0258083 A1* 9/2017 St. Germain .......... A01N 35/06

FOREIGN PATENT DOCUMENTS

| | | | |
|---|---|---|---|
| WO | 2019145245 | A1 | 8/2019 |
| WO | WO 2019/145245 | * | 8/2019 |
| WO | 2020114932 | A1 | 6/2020 |
| WO | WO 2020/114932 | * | 6/2020 |
| WO | 2021001273 | A1 | 1/2021 |

OTHER PUBLICATIONS

International Search Report and Written Opinion for International Application No. PCT/US2022/030640 issued Oct. 19, 2022.

* cited by examiner

*Primary Examiner* — Shirley V Gembeh

(74) *Attorney, Agent, or Firm* — E. Eric Mills; Nicholas P. Stadnyk; Maynard Nexsen PC

(57) ABSTRACT

The invention relates to the use of one or more compounds of the formula (I) or salts thereof, (I)

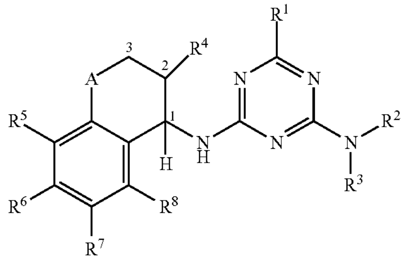

Figure 1:
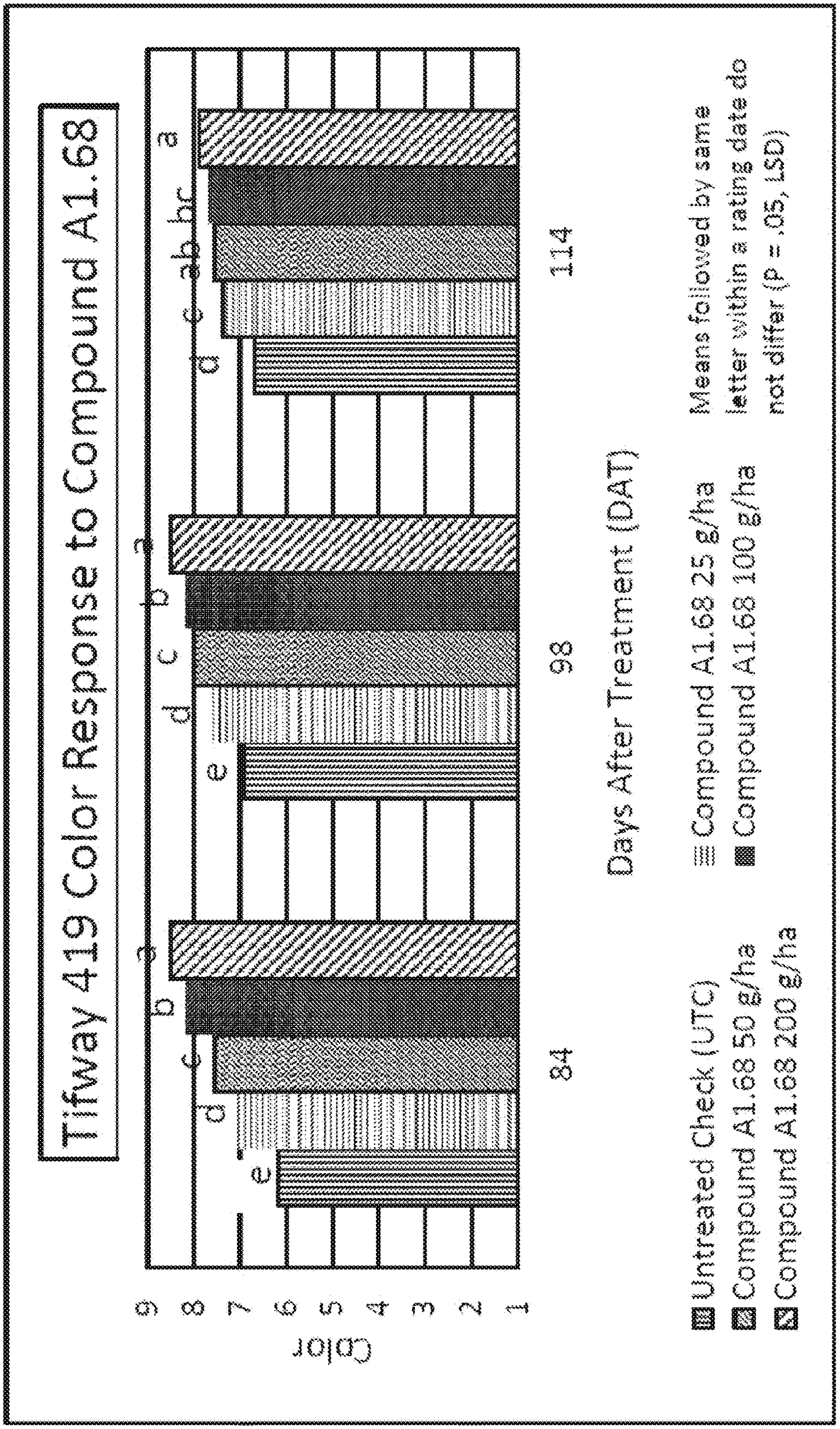

wherein the groups $R^1$ to $R^8$ are defined as set forth in claim 1, optionally in the presence of additional agrochemical active ingredients, for improving quality of turf or lawn.

20 Claims, 7 Drawing Sheets

Greening Effect of Bermudagrass treated with A1.68 (Back Rep is Labeled)

| | | | | |
|---|---|---|---|---|
| 401<br>3 | 402<br>1 | 403<br>4 | 404<br>5 | 405<br>2 |
| 301<br>2 | 302<br>5 | 303<br>1 | 304<br>3 | 305<br>4 |
| 201<br>5 | 202<br>4 | 203<br>2 | 204<br>1 | 205<br>3 |
| 101<br>1 | 102<br>2 | 103<br>3 | 104<br>4 | 105<br>5 |

Trial initiated February 14, 2018. Treatment rates in g/ha. Photo taken 12 Weeks After Treatment

METHOD FOR WEED CONTROL IN LAWN OR TURF

CROSS REFERENCE TO RELATED APPLICATIONS

This application is a continuation of U.S. patent application Ser. No. 18/563,808 filed on Nov. 22, 2023, which is a national phase application of International Application No. PCT/US2022/030640 filed on May 24, 2022, which claims the benefit of priority to U.S. Provisional Patent Application Ser. No. 63/192,902, titled "METHOD FOR WEED CONTROL IN LAWN OR TURF," filed May 25, 2021, the contents of each application are hereby incorporated by reference, for all purposes, in their entirety.

The invention relates to the field of plant protection and environmental health, more specifically to the use of agrochemicals for selective weed control in certain useful plants, particularly in various plants used for lawn or turf, and to improve turfgrass quality.

High quality, healthy turf or lawn is essential, for example, in the golfing industry but also generally desired for lawns, turf or green areas for parks, public or private gardens, sports grounds or arenas (e. g. more specifically turf for golf courses, horse racing, football, baseball, hockey, tennis, and utility turf such as roadsides, airports, industrial sites, etc.), and for greens in flower gardens, ornamental gardens, plantations and orchards. In the lawn management for instance in a garden, golf course, public green areas, roadsides, etc., control of lawn weeds is the most important task for keeping views and good maintenance of the site.

For the purpose of weed control in lawn or turf the agrochemicals to be used should show a selective action against the weeds, namely annual and perennial weeds and moss, without substantial injury to the turfgrass or lawn. Many herbicides used in weed control management do not show the selectivity required. Other agrochemicals have disadvantages in that the weed plants are not controlled sufficiently or that some weeds are not controlled at all (gaps). In addition, in particular during the dry season, several turfgrass species suffer from drought stress and/or, during dormancy, have a brownish color which is not well accepted by the consumer. Therefore, there is a need for novel and alternative methods to enhance turfgrass quality.

Compounds from the structural class of substituted isoxazoline carboxamides are known as herbicides useful for weed-control against a broad range of weeds from WO2018/228985 and WO2019/145245 in burn-down applications. It is also known to combine such herbicidal active ingredients with some other herbicides for weed control, see e. g. WO2020/114932.

Now it has been found that some compounds selected from the above group of substituted isoxazoline carboxamides surprisingly can not only be used for selective weed control in turf or lawn without substantial injury to the turf-grass or lawn. The selectivity for weed control in turfgrass is surprising because compounds (I) are otherwise known to be very active not only against dicotyledonous weeds but against many grass weeds as well. Furthermore, it was surprisingly found, that the above group of substituted isoxazoline carboxamides enhance the green color of turfgrass species as well as have a beneficial effect of turfgrass density.

One object of the invention is the use of one or more substituted isoxazoline carboxamides of the formula (I) or agrochemical acceptable salts thereof, (I)

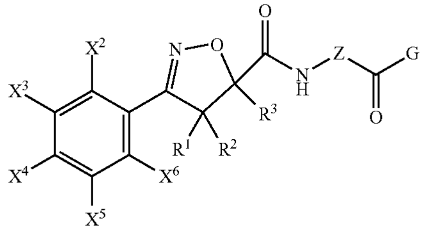

in which

G represents $OR^4$ or $NR^7R^8$ $R^1$ and $R^2$ each represent hydrogen;

$R^3$ represents $(C_1\text{-}C_5)$-alkyl, $(C_3\text{-}C_6)$-cycloalkyl, $(C_2\text{-}C_5)$-alkenyl, $(C_2\text{-}C_5)$-alkinyl or $(C_1\text{-}C_5)$-alkoxy each optionally substituted "m" times by substituents from the group consisting of halogen, cyano, $(C_1\text{-}C_5)$-alkoxy and hydroxy;

$R^4$ represents hydrogen, or represents $(C_1\text{-}C_{12})$-alkyl, $(C_3\text{-}C_7)$-cycloalkyl, $(C_3\text{-}C_7)$-cycloalkyl-$(C_1\text{-}C_8)$-alkyl, $(C_2\text{-}C_8)$-alkenyl, $(C_5\text{-}C_6)$-cycloalkenyl, $(C_1\text{-}C_4)$-alkylphenyl or $(C_2\text{-}C_8)$-alkinyl each optionally substitued "m" times by substituents from the group consisting of halogen, cyano, $(C_1\text{-}C_6)$-alkoxy, $(C_1\text{-}C_6)$-alkoxycarbonyl, hydroxy, $S(O)_nR^5$;

$R^5$ represents $(C_1\text{-}C_8)$-alkyl, $(C_2\text{-}C_8)$-alkenyl, $(C_3\text{-}C_6)$-cycloalkyl, benzyl, $CON((C_1\text{-}C_3)\text{-alkyl})_2$ or $(C_1\text{-}C_5)$-alkyl-C(O)—$(C_1\text{-}C_8)$-alkyl each optionally substituted "m" times by substituents from the group consisting of halogen and cyano;

$R^6$ represents hydrogen, or represents $(C_1\text{-}C_8)$-alkyl, $(C_3\text{-}C_6)$-cycloalkyl, $(C_3\text{-}C_8)$-alkenyl or $(C_3\text{-}C_8)$-alkinyl each optionally substituted "m" times by substituents from the group consisting of halogen, cyano und $(C_1\text{-}C_2)$-alkoxy;

$R^7$, $R^8$ independently of each other represent hydrogen, $(C_1\text{-}C_6)$-alkoxycarbonyl-$(C_1\text{-}C_6)$-alkyl, $N((C_1\text{-}C_3)\text{-alkyl})_2$, $S(O)_nR^5$, or $R^7$ and $R^8$ together with the nitrogen atom to which they are attached form a saturated or partially or fully unsaturated five-, six-, or seven-membered ring which may contain apart from the nitrogen atom "r" carbon atoms, "o" oxygen atoms and is optionally substituted "m" times by substituents from the group consisting of halogen, $(C_1\text{-}C_6)$-alkyl, halogen-$(C_1\text{-}C_6)$-alkyl, oxo, $CO_2R^6$;

Z represents Z-1 to Z-8:

Z-1

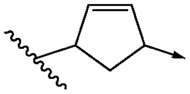

Z-2

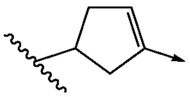

Z-3

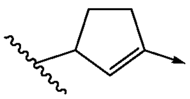

-continued

Z-4

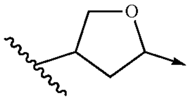

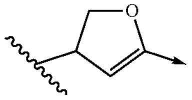

Z-6

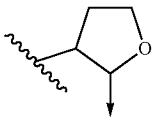

Z-7

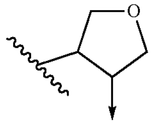

Z-8

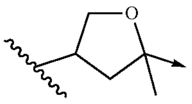

whereas the arrow represents the bonding to the group CO-G of the formula (I);

$X^2$, $X^4$ and $X^6$ independently of one another represent hydrogen or fluorine;

$X^3$ and $X^5$ independently of one another represent hydrogen, chlorine, cyano or fluorine;

or represents $(C_1-C_3)$-Alkyl, $(C_1-C_3)$-Alkoxy each optionally substituted "m" times by substituents from the group consisting of fluorine or chlorine;

m represents 0, 1, 2, 3, 4 or 5;

n represents 0, 1 or 2;

represents 0, 1 or 2;

r represents 3, 4, 5 or 6;

for enhancing green color and/or increasing density in turf or lawn.

Definitions

Halogen represents radicals of fluorine, chlorine, bromine and iodine. Preference is given to the radicals of fluorine and chlorine.

Alkyl means saturated straight-chain or branched hydrocarbyl radicals having the number of carbon atoms specified in each case, e.g. $C_1$-$C_6$-alkyl such as methyl, ethyl, propyl. 1-methylethyl, butyl, 1-methylpropyl, 2-methylpropyl. 1,1-dimethylethyl, pentyl, 1-methylbutyl, 2-methylbutyl, 3-methylbutyl, 2,2-dimethylpropyl, 1-ethylpropyl, hexyl, 1,1-dimethylpropyl, 1,2-dimethylpropyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl and 1-ethyl-2-methylpropyl.

Alkenyl means unsaturated straight-chain or branched hydrocarbyl radicals having the number of carbon atoms specified in each case and one double bond in any position, e.g. $C_2$-$C_6$-alkenyl such as ethenyl, 1-propenyl, 2-propenyl, 1-methylethenyl, 1-butenyl, 2-butenyl, 3-butenyl, 1-methyl-1-propenyl, 2-methyl-1-propenyl, 1-methyl-2-propenyl, 2-methyl-2-propenyl, 1-pentenyl, 2-pentenyl, 3-pentenyl, 4-pentenyl, 1-methyl-1-butenyl, 2-methyl-1-butenyl, 3-methyl-1-butenyl, 1-methyl-2-butenyl, 2-methyl-2-butenyl, 3-methyl-2-butenyl, 1-methyl-3-butenyl, 2-methyl-3-butenyl, 3-methyl-3-butenyl, 1,1-dimethyl-2-propenyl, 1,2-dimethyl-1-propenyl, 1,2-dimethyl-2-propenyl, 1-ethyl-1-propenyl, 1-ethyl-2-propenyl, 1-hexenyl, 2-hexenyl, 3-hexenyl, 4-hexenyl, 5-hexenyl, 1-methyl-1-pentenyl, 2-methyl-1-pentenyl, 3-methyl-1-pentenyl, 4-methyl-1-pentenyl, 1-methyl-2-pentenyl, 2-methyl-2-pentenyl, 3-methyl-2-pentenyl, 4-methyl-2-pentenyl, 1-methyl-3-pentenyl, 2-methyl-3-pentenyl, 3-methyl-3-pentenyl, 4-methyl-3-pentenyl, 1-methyl-4-pentenyl, 2-methyl-4-pentenyl, 3-methyl-4-pentenyl, 4-methyl-4-pentenyl, 1,1-dimethyl-2-butenyl, 1,1-dimethyl-3-butenyl, 1,2-dimethyl-1-butenyl, 1,2-dimethyl-2-butenyl, 1,2-dimethyl-3-butenyl, 1,3-dimethyl-1-butenyl, 1,3-dimethyl-2-butenyl, 1,3-dimethyl-3-butenyl, 2,2-dimethyl-3-butenyl, 2,3-dimethyl-1-butenyl, 2,3-dimethyl-2-butenyl, 2,3-dimethyl-3-butenyl, 3,3-dimethyl-1-butenyl, 3,3-dimethyl-2-butenyl, 1-ethyl-1-butenyl, 1-ethyl-2-butenyl, 1-ethyl-3-butenyl, 2-ethyl-1-butenyl, 2-ethyl-2-butenyl, 2-ethyl-3-butenyl, 1,1,2-trimethyl-2-propenyl, 1-ethyl-1-methyl-2-propenyl, 1-ethyl-2-methyl-1-propenyl and 1-ethyl-2-methyl-2-propenyl.

Alkynyl represents a straight-chain or branched hydrocarbyl groups having 2 to 8, preferably 2 to 6, carbon atoms and one triple bond in any position. Non-limiting examples include ethynyl, prop-1-ynyl, prop-2-ynyl, but-1-ynyl, but-2-ynyl, but-3-ynyl, 1-methylprop-2-ynyl, pent-1-ynyl, pent-2-ynyl, pent-3-ynyl, pent-4-ynyl, 1-methylbut-2-ynyl, 1-methylbut-3-ynyl, 2-methylbut-3-ynyl, 3-methylbut-1-ynyl, 1,1-dimethylprop-2-ynyl, 1-ethylprop-2-ynyl, hex-1-ynyl, hex-2-ynyl, hex-3-ynyl, hex-4-ynyl, hex-5-ynyl, 1-methylpent-2-ynyl, 1-methylpent-3-ynyl, 1-methylpent-4-ynyl, 2-methylpent-3-ynyl, 2-methylpent-4-ynyl, 3-methylpent-1-ynyl, 3-methylpent-4-ynyl, 4-methylpent-1-ynyl, 4-methylpent-2-ynyl, 1,1-dimethylbut-2-ynyl, 1,1-dimethylbut-3-ynyl, 1,2-dimethylbut-3-ynyl, 2,2-dimethylbut-3-ynyl, 3,3-dimethylbut-1-ynyl, 1-ethylbut-2-ynyl, 1-ethylbut-3-ynyl, 2-ethylbut-3-ynyl and 1-ethyl-1-methylprop-2-ynyl.

Cycloalkyl means a carbocyclic saturated ring system having preferably 3-8 ring carbon atoms, for example cyclopropyl, cyclobutyl, cyclopentyl or cyclohexyl. In the case of optionally substituted cycloalkyl, cyclic systems with substituents are included, also including substituents with a double bond on the cycloalkyl radical, for example an alkylidene group such as methylidene.

Alkoxy means saturated straight-chain or branched alkoxy radicals having the number of carbon atoms specified in each case, for example $C_1$-$C_6$-alkoxy such as methoxy, ethoxy, propoxy, 1-methylethoxy, butoxy, 1-methylpropoxy, 2-methylpropoxy, 1,1-dimethylethoxy, pentoxy, 1-methylbutoxy, 2-methylbutoxy, 3-methylbutoxy, 2,2-dimethylpropoxy, 1-ethylpropoxy, hexoxy, 1,1-dimethylpropoxy, 1,2-dimethylpropoxy, 1-methylpentoxy, 2-methylpentoxy, 3-methylpentoxy, 4-methylpentoxy, 1,1-dimethylbutoxy, 1,2-dimethylbutoxy, 1,3-dimethylbutoxy, 2,2-dimethylbutoxy, 2,3-dimethylbutoxy, 3,3-dimethylbutoxy, 1-ethylbutoxy, 2-ethylbutoxy, 1,1,2-trimethylpropoxy, 1,2,2-trimethylpropoxy, 1-ethyl-1-methylpropoxy and 1-ethyl-2-methylpropoxy. Halogen-substituted alkoxy means straight-chain or branched alkoxy radicals having the number of carbon atoms specified in each case, where some or all of the hydrogen atoms in these groups may be replaced by halogen atoms as specified above, e.g. $C_1$-$C_2$-haloalkoxy such as chloromethoxy, bromomethoxy, dichloromethoxy, trichloromethoxy, fluoromethoxy, difluoromethoxy, trifluoromethoxy, chlorofluoromethoxy, dichlorofluoromethoxy, chlorodifluoromethoxy, 1-chloroethoxy, 1-bromoethoxy, 1-fluoroethoxy, 2-fluoroethoxy, 2,2-difluoroethoxy, 2,2,2-trifluoroethoxy, 2-chloro-2-fluoroethoxy, 2-chloro-1,2-difluoroethoxy, 2,2-dichloro-2-fluoroethoxy, 2,2,2-trichloroethoxy, pentafluoroethoxy and 1,1,1-trifluoroprop-2-oxy.

In the following the compounds of formula (I) or their salts to be used according to the invention are also in short named as "compounds (I) according to the invention" or just "compounds (I)".

The compounds (I) or salts thereof are generally known from WO2018/228985 and WO2019/145245 or can be prepared according to the processes described therein.

Preferred are compounds (Ia) or agrochemical acceptable salts thereof (Ia)

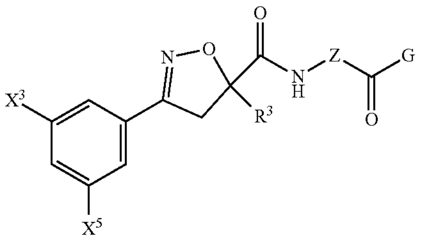

in which $X^3$, $X^5$, $R^3$ and G are as described above;

Z means Z-1a, Z-1b, Z-2a, Z-3a, Z-4a, Z-5a, Z-6a, Z-7a, Z-8a,

Z-1a

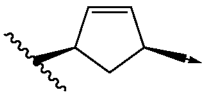

Z-1b

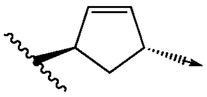

Z-2a

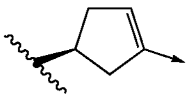

Z-3a

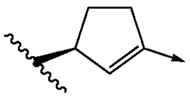

Z-4a

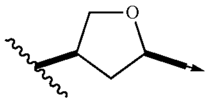

Z-5a

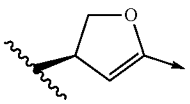

Z-6a

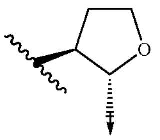

-continued

Z-7a

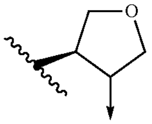

Z-8a

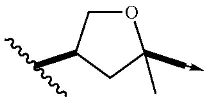

wherein Z-4a means the mixture of both structures Z-4b and Z-4c;

Z-4a

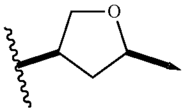

=

Z-4b

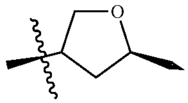

Z-4c

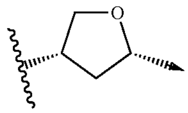

and wherein Z-8a means the mixture of both structures Z-8b and Z-8c

Z-8a

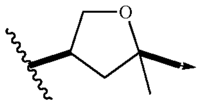

=

Z-8b

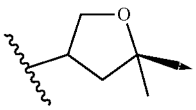

+

Z-8c

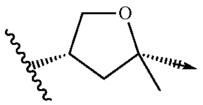

;

and wherein the arrow means a bond to the group CO-G in formula (Ia)

for use in enhancing green color and/or increasing density in turf or lawn.

Especially preferred are compounds (Ia) shown in table 1 or agrochemical acceptable salts thereof for use in enhancing green color and/or increasing density in turf or lawn:

(Ia)
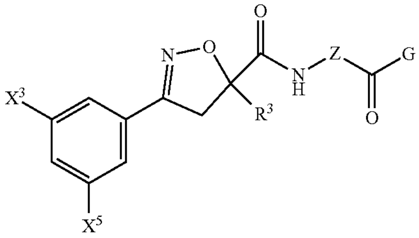
(Ia)
TABLE 1
| Compounds (Ia) | | | | |
|---|---|---|---|---|
| No. | $X^3$ | $X^5$ | $R^3$ | 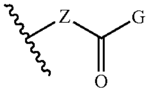 |
| A 1.1 | F | F | (R)—$CH_2Cl$ | 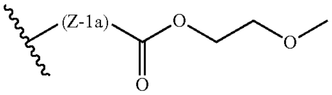 |
| A 1.2 | F | CN | (R)—$CF_3$ | 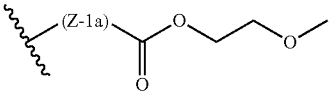 |
| A 1.3 | F | F | (R)—$CF_3$ | 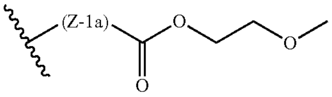 |
| A 1.4 | F | H | (R)—$CH_3$ | 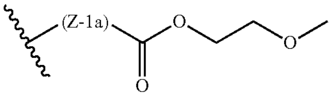 |
| A 1.5 | Cl | CN | (R)—$CH_3$ | 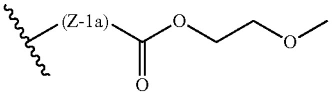 |
| A 1.6 | F | H | (S)-vinyl | 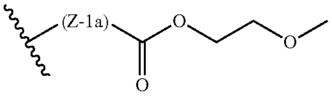 |
| A 1.7 | F | F | (R)—$CF_3$ | 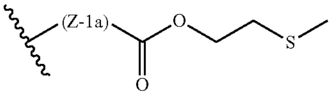 |
| A 1.8 | F | $CH_3$ | (R)—$CF_3$ | 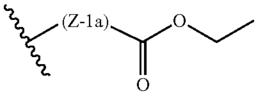 |
| A 1.9 | H | H | (R)—$CF_3$ | 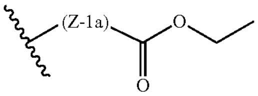 |
| A 1.10 | F | F | (R)—$CH_3$ | 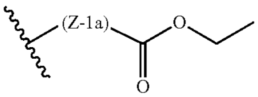 |

TABLE 1-continued
| Compounds (Ia) | | | | |
|---|---|---|---|---|
| No. | $X^3$ | $X^5$ | $R^3$ | 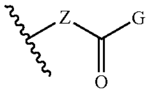 |
| A 1.11 | H | H | (R,S)—$CF_3$ | 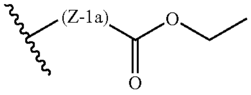 |
| A 1.12 | $OCH_3$ | $OCH_3$ | (R,S)—$CF_3$ | 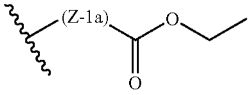 |
| A 1.13 | F | F | (R,S)—$CH_3$ | 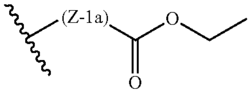 |
| A 1.14 | F | F | (S)-vinyl | 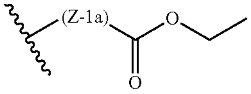 |
| A 1.15 | F | F | (R,S)—$OCH_3$ | 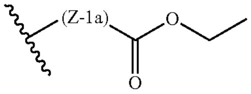 |
| A 1.16 | F | F | (R)—$OCH_3$ | 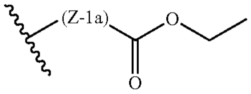 |
| A 1.17 | F | F | (R)—$CH_2F$ | 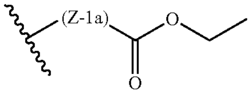 |
| A 1.18 | F | H | (R)—$CF_3$ | 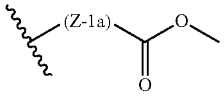 |
| A 1.19 | F | F | (R)—$CH_3$ | 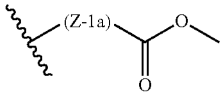 |
| A 1.20 | F | H | (R)—$CH_3$ | 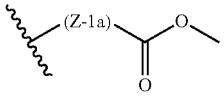 |
| A 1.21 | F | Cl | (R)—$CH_3$ | 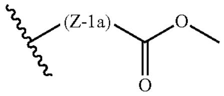 |
| A 1.22 | F | $CH_3$ | (R,S)—$CF_3$ | 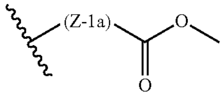 |
| A 1.23 | Cl | CN | (R,S)—$CH_3$ | 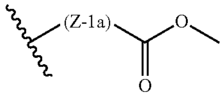 |

TABLE 1-continued
| Compounds (Ia) | | | | |
|---|---|---|---|---|
| No. | $X^3$ | $X^5$ | $R^3$ | 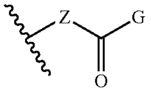 |
| A 1.24 | F | CN | (R,S)—$CH_3$ | 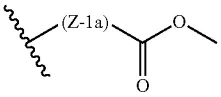 |
| 1.25 | F | H | (S)-vinyl | 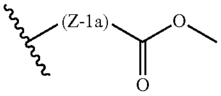 |
| A 1.26 | F | F | (S)-vinyl | 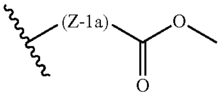 |
| A 1.27 | F | F | (R)—$CH_3$ | 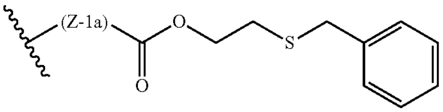 |
| A 1.28 | F | H | (R)—$CH_3$ | 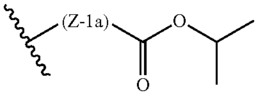 |
| A 1.29 | F | F | (R)—$CH_3$ | 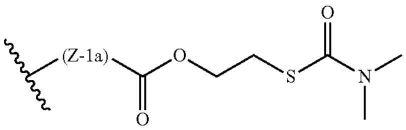 |
| A 1.30 | F | F | (R)—$CH_3$ | 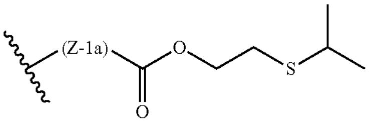 |
| A 1.31 | F | F | (R)—$CH_3$ | 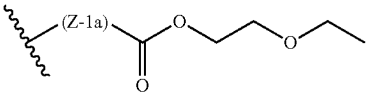 |
| A 1.32 | F | H | (R)—$CH_3$ | 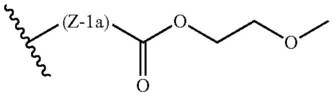 |
| A 1.33 | F | F | (R)—$CH_3$ | 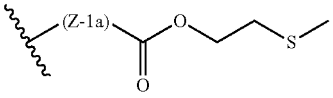 |
| A 1.34 | F | F | (R)—$CH_3$ | 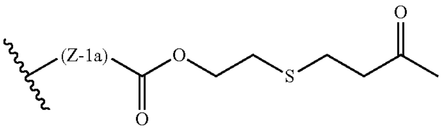 |
| A 1.35 | F | F | (R)—$CH_3$ | 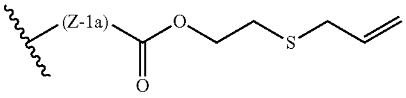 |

TABLE 1-continued
| Compounds (Ia) | | | | |
|---|---|---|---|---|
| No. | $X^3$ | $X^5$ | $R^3$ | 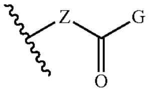 |
| A 1.36 | F | F | (R)—$CH_3$ | 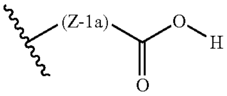 |
| A 1.37 | F | F | (R)—$CH_3$ | 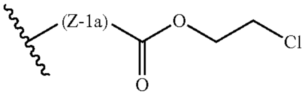 |
| A 1.38 | F | F | (R)—$CH_3$ | 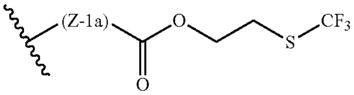 |
| A 1.39 | F | H | (R)—$CH_3$ | 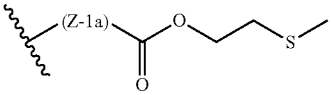 |
| A 1.40 | F | F | (R)—$CH_3$ | 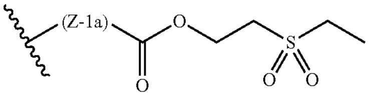 |
| A 1.41 | F | F | (R)—$CH_3$ | 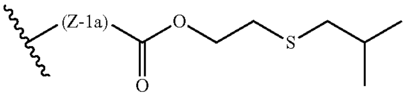 |
| A 1.42 | F | F | (R)—$CH_3$ | 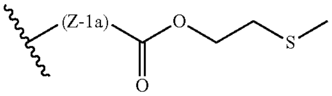 |
| A 1.43 | F | CN | (R,S)—$CF_3$ | 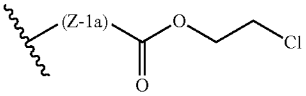 |
| A 1.44 | F | CN | (R,S)—$CF_3$ | 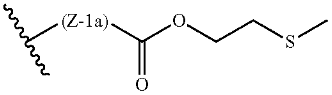 |
| A 1.45 | Cl | CN | (R,S)—$CH_3$ | 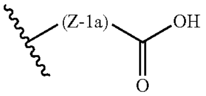 |
| A 1.46 | F | F | (R,S)—$CH_3$ | 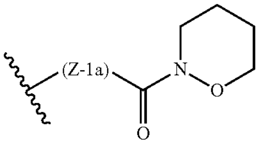 |
| A 1.47 | F | F | (R,S)—$CH_3$ | 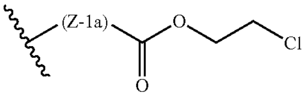 |

TABLE 1-continued
Compounds (Ia)
| No. | $X^3$ | $X^5$ | $R^3$ | 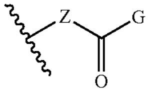 |
|---|---|---|---|---|
| A 1.48 | F | F | (R,S)-vinyl | 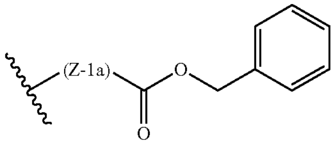 |
| A 1.49 | F | F | (R,S)-vinyl | 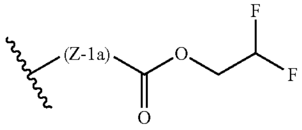 |
| A 1.50 | F | F | (S)-vinyl | 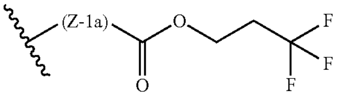 |
| A 1.51 | F | H | (S)-vinyl | 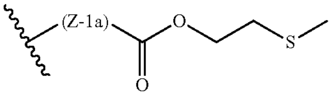 |
| A 1.52 | F | F | (S)-vinyl | 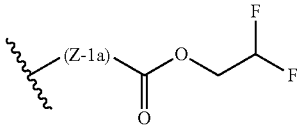 |
| A 1.53 | F | Cl | (R,S)—$CH_3$ | 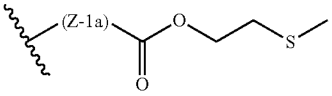 |
| A 1.54 | F | F | (R)-cPr | 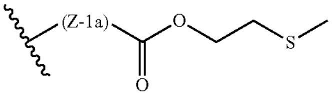 |
| A 1.55 | F | F | (R)—$CH_2Cl$ | 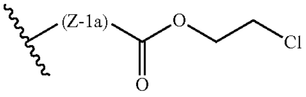 |
| A 1.56 | F | F | (R)—$CF_3$ | 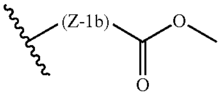 |
| A 1.57 | F | F | (S)-vinyl | 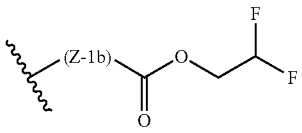 |
| A 1.58 | F | F | (S)-vinyl | 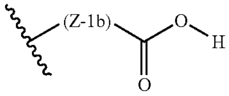 |
| A 1.59 | F | H | (R,S)—$CH_3$ | 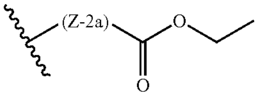 |

TABLE 1-continued
Compounds (Ia)
| No. | $X^3$ | $X^5$ | $R^3$ | 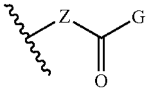 |
|---|---|---|---|---|
| A 1.60 | F | F | (R,S)-vinyl | 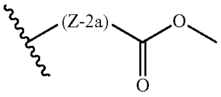 |
| A 1.61 | F | F | (R,S)—$CH_3$ | 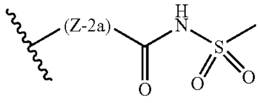 |
| A 1.62 | F | F | (R,S)—$CH_3$ | 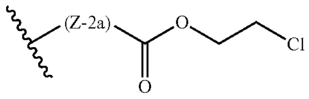 |
| A 1.63 | F | F | (R)—$CH_3$ | 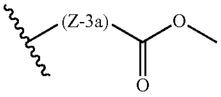 |
| A 1.64 | F | F | (R)—$CH_3$ | 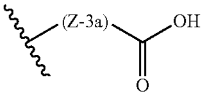 |
| A 1.65 | F | $CH_3$ | (S)-vinyl | 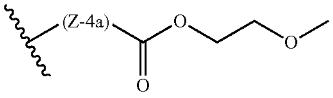 |
| A 1.66 | F | F | (S)-vinyl | 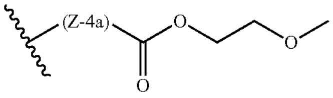 |
| A 1.67 | F | H | (R,S)—$CH_3$ | 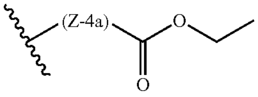 |
| A 1.68 | F | F | (S)-vinyl | 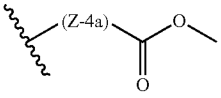 |
| A 1.69 | F | F | (S)-vinyl | 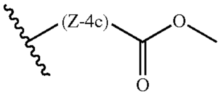 |
| A 1.70 | F | F | (S)-vinyl | 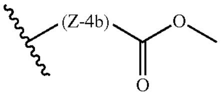 |
| A 1.71 | F | $CH_3$ | (S)-vinyl | 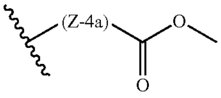 |
| A 1.72 | F | F | (R,S)—$OCH_3$ | 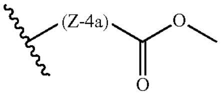 |

TABLE 1-continued
| Compounds (Ia) | | | | |
|---|---|---|---|---|
| No. | $X^3$ | $X^5$ | $R^3$ | 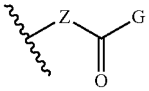 |
| A 1.73 | F | F | (R)—$CH_3$ | 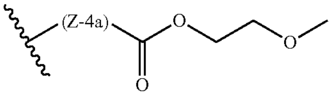 |
| A 1.74 | F | F | (R)—$CH_3$ | 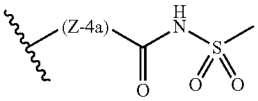 |
| A 1.75 | F | F | (R)—$CH_3$ | 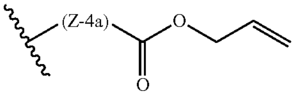 |
| A 1.76 | F | F | (R)—$CH_3$ | 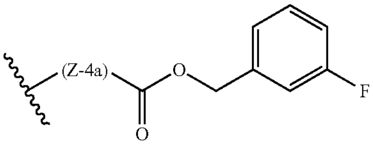 |
| A 1.77 | F | H | (R,S)—$CH_3$ | 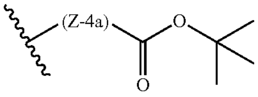 |
| A 1.78 | F | H | (R,S)—$CH_3$ | 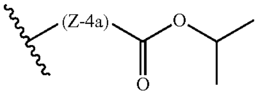 |
| A 1.79 | F | H | (R,S)—$CH_3$ | 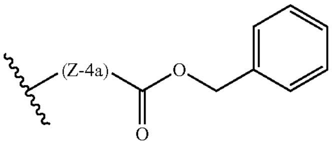 |
| A 1.80 | F | F | (S)-vinyl | 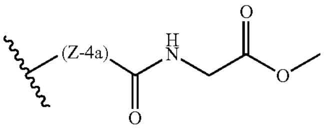 |
| A 1.81 | F | F | (S)-vinyl | 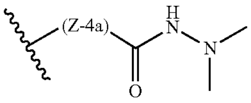 |
| A 1.82 | F | F | (S)-vinyl | 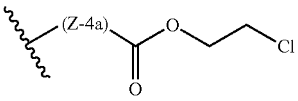 |
| A 1.83 | F | F | (S)-vinyl | 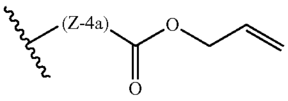 |

TABLE 1-continued

| Compounds (Ia) | | | | |
|---|---|---|---|---|
| No. | $X^3$ | $X^5$ | $R^3$ | 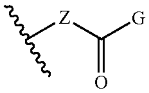 |
| A 1.84 | F | F | (S)-vinyl | 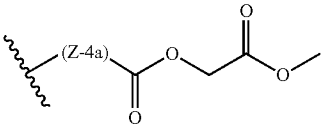 |
| A 1.85 | F | $CH_3$ | (S)-vinyl | 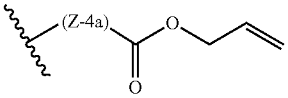 |
| A 1.86 | F | $CH_3$ | (S)-vinyl | 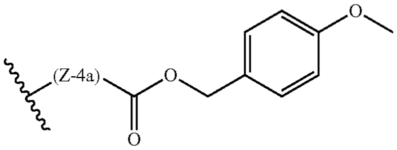 |
| A 1.87 | F | F | (S)-vinyl | 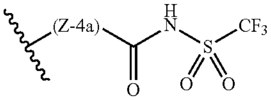 |
| A 1.88 | F | F | (R)—$CF_2CH_3$ | 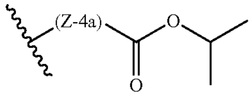 |
| A 1.89 | F | $CH_3$ | (S)-vinyl | 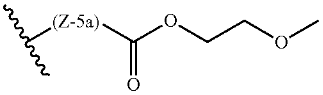 |
| A 1.90 | $CH_3$ | $CH_3$ | (S)-vinyl | 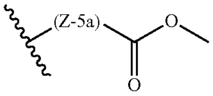 |
| A 1.91 | F | F | (S)-vinyl | 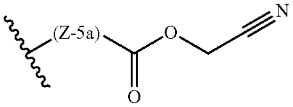 |
| A 1.92 | F | F | (R)—$CH_3$ | 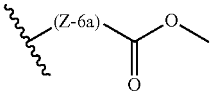 |
| A 1.93 | F | F | (R,S)—$CH_3$ | 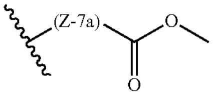 |
| A 1.94 | F | F | (R)—$CF_2CH_3$ | 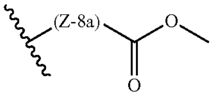 |

Even more preferred are compounds A1.36, A1.26 and 1.68. Most preferred is compound A1.68.

The compounds of the formula (I) and their salts, all termed herein below as compounds of formula (I), show herbicidal activity against a broad range of economically important monocotyledonous and dicotyledonous harmful plants. The compounds of formula (I) also act efficiently on perennial weeds which produce shoots from rhizomes, root stocks or other perennial organs and which are difficult to control.

The herbicidal compounds (I) mentioned above show an excellent and desirable effect in terms of enhancing green color and/or increasing density in turf or lawn without or substantial without injury to the lawn or turf.

The terms "lawn" or "turf" are used in the following for describing more or less the same types of plant species which can be used for generating a high-quality lawn or turf. Therefore, when using the term "lawn" only, it defines plant species which can be used for turf as well and vice versa. The term "lawn" or "turf" describes all uses of well-maintained grass in golf courses, sports turf like football or soccer places, landscape situations, parks, home and gardens or all other situations were grasses are grown for achieving a well maintained ground cover that is functional for all types of sport activities or for aesthetic or functional purposes such as utility turf e.g. at roadsides, airports, industrial sites, etc.. According to the invention by "turf" is understood as a group of turfgrass, which covers a surface area of ground and is subject to regular maintenance.

More generally, lawn or turfgrass include annual or perennial *Gramineae*, said *gramineae* preferably belonging to one or more of the genera *Agropyron, Agrostis, Axonopus, Bromus, Buchloe, Cynodon, Eremochloa, Festuca, Lolium, Paspulum, Pennisetum, Phleum, Poa, Stenotaphrum* or *Zoysia*, but also *Sorghum, Andropogon, Bouteloua, Sorghastrum Schizachyrium, Muhlenbergia, Koeleria* and *Panicum*. Examples of species belonging to these genera include *Cynodon dactylon, Cynodon transvaalensis*, crosses of these two species, *Eremochloa ophiuroides, Pasapalum notatum, Zoysia* spp., *Stenotaphrum secundatum, Axonopus* spp., *Pennisetum clandestinum, Festuca rubra, Festuca arundinacea, Agrostis stolonifera, Agrostis tenuis, Poa pratensis, Lolium perenne, Sorghum halapense, Andropogon virginicus, Andorpogon gerardii, Boutaloua dactyloides, Sorghastrum nutans, Schizachyrium scoparium, Mulhenbergia* spp., *Andropogon hallii, Koleria macrantha* and *Panicum virgatum.*

More preferably, said *gramineae* belongs to one or more of the genera *Buchloe, Cynodon, Eremochloa, Paspulum, Pennisetum, Stenotaphrum* or *Zoysia*. Even more preferably, said *Gramineae* belong to one or more of the genera *Cynodon* and *Eremochloa*, most preferably one or more of the species *Cynodon dactylon, Cynodon transvaalensis*, crosses of these two species *Eremochloa ophiuroides* and *Stenotraphrum secundatum.*

The present invention can be practiced with all turfgrasses including their varieties and hybrids, in particular warm season turfgrass.

Further examples of warm season turfgrasses are Bermudagrasses (*Cynodon* L. C. Rich), Zoysiagrasses (*Zoysia* Willd.), St. Augustinegrass (*Stenotaphrum secundatum* (Watt.) Kuntze), Centipedegrass (*Eremochloa ophiuroides* (Munro.) Hack.), Carpetgrass (*Axonopus Beauv.*), Bahiagrass (*Paspalum notatum* Flugge.), Kikuyugrass (*Pennisetum clandestinum* Hochst. ex Chiov.), Buffalograss (*Buchloe dactyloides* (Nutt.) Engelm.) and *Seashore paspalum* (*Paspalum vaginatum* swartz).

The herbicidal compounds (I) of the present invention can also be used for controlling various kinds of weeds developing on the lawn or turf.

It is to be noted that important plant varieties for lawn and turf such as those listed above are not damaged at appropriate dosages of up to 200 g/ha that may depend on the turfgrass species when applied before or, preferably, after emergence of the turfgrasses or when applied on established turf or lawn.

"Established turf or lawn" means dormant turf or actively growing turf grass. "Dormant turf" means a turf already grown and emerged but not actively growing due to cold weather conditions, e.g. turf between the vegetation periods, or which have temporarily ceased shoot growth as a result of extended drought, heat or cold stress.

For these reasons, the present compounds are suitable for the selective control of undesired vegetation on lawn or turf or the soil where the lawn or turf is grown.

The term "locus" of a plant or plants comprises the plant or plants, part of the plants, seed of the plants or the area where the plants are growing. Such plants are the plants of lawn or turf. Particularly, the "locus of turfgrass" as used herein is intended to embrace the place on which the turfgrass are growing, the place where the seeds of the turfgrass are sown or the place where the seeds of the turfgrass will be placed for subsequent plant growth. According to the invention, the "locus of a turf" can relate to soil or to a substrate. Preferably, the term relates to the plant or plant parts. An example for such a locus is a golf course, on which turfgrass is managed.

According to the invention the term "soil" means natural soil, which is typically present on a land area, such as soil being present on a golf course, or means soil, that has been modified, such as soil being granulated and/or treated with agrochemicals, such as for example fertilizers.

According to the invention the term "substrate" means a medium for the growth of turfgrass and the like, suited for application to a variety of existing ground structures. Typically, such mediums are soil-free mixtures that include sufficient proportions of ingredients of elastomeric granules, suitable binding emulsion, mineral aggregate, filler and controlled release plant nutrient particles, so that when laid and cured, said mixture produces a water permeable, resilient substrate having air pockets through which a root system of turfgrass can penetrate. Turfgrass growing on said substrate can form a turf, which can be applied to non-porous surfaces, such as for example roofs of buildings, terraces and other hard surface areas, or to porous surfaces, such as for example football fields or golf courses. Elastomeric granules can be, for example, granules of rubber, granules of recycled vehicle tyre rubber or mixtures thereof.

The compounds (I) according to the invention are generally applied to the turfgrass plants or seed thereof by treating the locus thereof with an agricultural composition comprising one or more compounds (I) or salts thereof.

The amount of compounds (I) to be applied will depend on various factors, such as the subject of the treatment, such as, plants or soil, the type of treatment, such as, for example spraying or spreading, the purpose of the treatment, such as, for example preventive or curative, the application time, environmental conditions or turfgrass species.

The compounds (I) according to the invention can be applied to the locus of the lawn or turf with a composition ("composition according to the invention") comprising one or more compounds (I) or salts thereof. Within said embodiment of the invention, the compounds (I) or compositions according to the invention are preferably applied to the locus of the lawn or turf by spraying or drenching liquid (sprayable) formulations or dissolvable or dispersing formulations. Spray and drench application with water volumes from 50 to 10000 liter per hectare can be applied with all common application equipment like large motor driven professional spray equipment, knapsack sprayer, hose end applicators, RTU pump sprayers, aerosol cans, ULV applicators or watering cans.

Furthermore, the herbicidal compounds (I) can be applied by spreading or granular (active ingredient on inert or active ingredient on fertilizer) formulations It is also possible to water in the product after applications with additional irrigations for all application methods.

In one embodiment, the compositions are applied to the (locus of the) turfgrass as a sprayable liquid formulation. In another embodiment, the compositions are applied to the (locus of the) turfgrass as a granular formulation. Suitable granules include inert and fertilizer granules. The active ingredient may be dispersed throughout, impregnated into, or coated on the surface of the granules.

Treatment of turfgrass may be performed by lawn care operators, greenkeepers or home owners.

To maintain high quality, healthy turfgrass on the intended surface area of ground, such as for example, a golf course, a sports field, a park area or a home lawn, and to protect said turfgrass against weed plants, the compositions according to the invention are applied to the turf once or more than once during maintenance of the turfgrass.

Preferably, the compositions according to the invention are applied to the turfgrass once or more than once during a growing season of the turfgrass or during turfgrass winter dormancy.

The compositions according to the invention can be applied to the soil before or after the seeds of the turfgrass are sown or placed into the soil; or the compositions according to the invention can be applied to a substrate for the growth of turfgrass before or after the seeds of the turfgrass are placed into the substrate; or the compositions according to the invention can be applied to the soil before turfgrass grown on a substrate are placed on top of the soil together with the substrate.

With the composition according to the invention at the appropriate rates it is possible to increase green color and/or density of turfgrass, while the parts of turfgrass existing or which grow later are not substantially damaged.

The application rates for the compounds of formula (I) or salts thereof can vary within a broad range and generally depend on the turfgrass species, the soil type and weather conditions or whether the compounds are combined with other herbicidal active ingredients. Suitable application rates generally are within the range of from 0.01 to 2000 g active ingredient (=compounds (I)) per hectare (a.i./ha), preferably of from 0.5 to 500 g a.i./ha, more preferably 1 bis 250 g a.i./ha. For the present use on turfgrass, suitable application rates range from between 0.5 and 250 g/ha, preferably between 20 and 220 g/ha, more preferably between 25 and 200 g/ha.

It is also possible to use the compounds (I) in combination with other pesticidally active substances or nutrients, such as, for example, insecticides, acaricides, herbicides, fungicides, safeners, fertilizers and/or growth regulators.

The invention thus also relates to a method of improving quality in lawn or turf which comprises applying one or more type (A) herbicides, optionally together, before or after the treatment with one or more other active ingredients selected from the group consisting of type (B) herbicides and optionally other type (C) active ingredients useful in the treatment of lawn or turf, to the weeds, parts of the weed plants, seeds of the weed plants or the area under cultivation where the plants of lawn or turf are growing or to be sown.

Type (A) herbicides are the compounds of formula (I) or their salts.

Type (B) herbicides are other herbicides useful to be combined with compounds (I) for the purpose of broadening weed spectrum to be controlled or increasing herbicidal effect (some possible type B herbicides are mentioned further below).

Type (C) active ingredients useful in the treatment of lawn or turf can be, for instance, insecticides, acaricides, fungicides, safeners, fertilizers and/or growth regulators or nutrients useful for treating lawn or turf against phytopathogenic diseases or for growth regulation or growth promotion of lawn or turf.

Possible combination partners as type (B) herbicides for the inventive active ingredients, in mixed formulations or in a tankmix, are, for example, known active ingredients which are based on inhibition of, for example, acetolactate synthase, acetyl-coenzyme A carboxylase, PS I, PS II, HPPDO, phytoene desaturase, protoporphyrinogen oxidase, glutamine synthetase, cellulose biosynthesis, 5-enolpyruvylshikimate-3-phosphate synthetase. Such compounds, and also other usable compounds, with a mechanism of action that is, in some cases, unknown or different, are described, for example, in Weed Research 26, 441-445 (1986), or "The Pesticide Manual", 14th edition 2006/2007, published by the British Crop Protection Council (hereinafter also abbreviated to "PM"), "The e-Pesticide Manual", version 4.0 2006/2007, published by the British Crop Protection Council and literature cited there, "Compendium of Pesticide Common Names" available from the internet (http://www.alanwood.net/pesticides/).

Herbicides, plant growth regulators and herbicide safeners, which are known from the literature and which can be combined with the compounds of the formula (I), include, for example, the following active ingredients (note: the compounds are either referred to by the common name in accordance with the International Organization for Standardization (ISO) or by the chemical name, if appropriate together with a customary code number):

Acetochlor, acifluorfen, acifluorfen-sodium, aclonifen, alachlor, allidochlor, alloxydim, alloxydim-sodium, ametryn, amicarbazone, amidochlor, amidosulfuron, 4-amino-3-chloro-5-fluoro-6-(7-fluoro-1H-indol-6-yl)pyridine-2-carboxylic acid, aminocyclopyrachlor, aminocyclopyrachlor-potassium, aminocyclopyrachlor-methyl, aminopyralid, amitrole, ammoniumsulfamate, anilofos, asulam, atrazine, azafenidin, azimsulfuron, beflubutamid, benazolin, benazolin-ethyl, benfluralin, benfuresate, bensulfuron, bensulfuron-methyl, bensulide, bentazone, benzobicyclon, benzofenap, bicyclopyron, bifenox, bilanafos, bilanafos-sodium, bispyribac, bispyribac-sodium, bixlozone, bromacil, bromobutide, bromofenoxim, bromoxynil, bromoxynil-butyrate, -potassium, -heptanoate, and -octanoate, busoxinone, butachlor, butafenacil, butamifos, butenachlor, butralin, butroxydim, butylate, cafenstrole, carbetamide, carfentrazone, carfentrazone-ethyl, chloramben, chlorbromuron, 1-{2-chloro-3-[(3-cyclopropyl-5-hydroxy-1-methyl-1H-pyrazol-4-yl)carbonyl]-6-(trifluormethyl)phenyl}piperidin-2-on, 4-{2-chloro-3-[(3,5-dimethyl-1H-pyrazol-1-yl)methyl]-4-(methylsulfonyl) benzoyl}-1,3-dimethyl-1H-pyrazol-5-yl-1,3-dimethyl-1H-pyrazol-4-carboxylat, chlorfenac, chlorfenac-sodium, chlorfenprop, chlorflurenol, chlorflurenol-methyl, chloridazon, chlorimuron, chlorimuron-ethyl, 2-[2-chloro-4-(methylsulfonyl)-3-(morpholin-4-ylmethyl)benzoyl]-3-hydroxycyclohex-2-en-1-on, 4-{2-chloro-4-(methylsulfonyl)-3-[(2,2,2-trifluorethoxy)methyl]benzoyl}-1-ethyl-1H-pyrazol-5-yl-1,3-dimethyl-1H-pyrazol-4-carboxylat, chlorophthalim, chlorotoluron, chlorthal-dimethyl, 3-[5-chloro-4-(trifluormethyl)pyridine-2-yl]-4-hydroxy-1-methylimidazolidine-2-on, chlorsulfuron, cinidon, cinidon-ethyl, cinmethylin, cinosulfuron, clacyfos, clethodim, clodinafop, clodinafop-propargyl, clomazone, clomeprop, clopyralid, cloransulam, cloransulam-methyl, cumyluron, cyanamide, cyanazine, cycloate, cyclopyranil, cyclopyrimorate, cyclosulfamuron, cycloxydim, cyhalofop, cyhalofop-butyl, cyprazine, 2,4-D, 2,4-D-butotyl, -butyl, -dimethylammonium, -diolamin, -ethyl, -2-ethylhexyl, -isobutyl, -isooctyl, -isopropylammonium, -potassium, -triisopropanolammonium, and -trolamine, 2,4-DB, 2,4-DB-butyl, -dimethylammonium, -isooctyl, -potassium, and -sodium, daimuron (dymron), dalapon, dazomet, n-decanol, desmedipham, detosyl-pyrazolate (DTP), dicamba, dichlobenil, dichlorprop, dichlorprop-P, diclofop, diclofop-methyl, diclofop-P-methyl, diclosulam, difenzoquat, diflufenican, diflufenzopyr, diflufenzopyr-sodium, dimefuron, dimepiperate, dimethachlor, dimethametryn, dimethenamid, dimethenamid-P, 3-(2,6-dimethylphenyl)-6-[(2-hydroxy-6-oxocyclohex-1-en-1-yl)carbonyl]-1-methylchinazolin-2,4(1H,3H)-dion, 1,3-dimethyl-4-[2-(methylsulfonyl)-4-(trifluormethyl)benzoyl]-1H-pyrazol-5-yl-1,3-dimethyl-1H-pyrazol-4-carboxylat, dimetrasulfuron, dinitramine, dinoterb, diphenamid, diquat, diquat-dibromid, dithiopyr, diuron, DMPA, DNOC, endothal, EPTC, esprocarb, ethalfluralin, ethametsulfuron, etha-metsulfuron-methyl, ethiozin, ethofumesate, ethoxyfen, ethoxyfen-ethyl, ethoxysulfuron, etobenzanid, ethyl-[(3-{2-chloro-4-fluoro-5-[3-methyl-2,6-dioxo-4-(trifluormethyl)-3,6-dihydropyrimidin-1(2H)-yl]phenoxy}pyridin-2-yl)oxy]acetat, F-9960, F-5231, i.e. N-{2-chloro-4-fluoro-5-[4-(3-fluoropropyl)-5-oxo-4,5-dihydro-1H-tetrazol-1-yl] phenyl}ethanesulfonamide, F-7967, i.e. 3-[7-chloro-5-fluoro-2-(trifluoromethyl)-1H-benzimidazol-4-yl]-1-methyl-6-(trifluoromethyl)pyrimidine-2,4(1H,3H)-dione fenoxaprop, fenoxaprop-P, fenoxaprop-ethyl, fenoxaprop-P-ethyl, fenoxasulfone, fenquinotrione, fentrazamide, flamprop, flamprop-M-isopropyl, flamprop-M-methyl, flazasulfuron, florasulam, fluazifop, fluazifop-P, fluazifop-butyl, fluazifop-P-butyl, flucarbazone, flucarbazone-sodium, flucetosulfuron, fluchloralin, flufenacet, flufenpyr, flufenpyr-ethyl, flumetsulam, flumiclorac, flumiclorac-pentyl, flumioxazin, fluometuron, flurenol, flurenol-butyl, -dimethylammonium and -methyl, fluoroglycofen, fluoroglycofen-ethyl, flupropanate, flupyrsulfuron, flupyrsulfuron-methyl-sodium, fluridone, flurochloridone, fluroxypyr, fluroxypyr-meptyl, flurtamone, fluthiacet, fluthiacet-methyl, fomesafen, fomesafen-sodium, foramsulfuron, fosamine, glufosinate, glufosinate-ammonium, glufosinate-P-sodium, glufosinate-P-ammonium, glufosinate-P-sodium, glyphosate, glyphosate-ammonium, -isopropylammonium, -diammonium, -dimethylammonium, -potassium, -sodium, and -trimesium, H-9201, i.e. O-(2,4-dimethyl-6-nitrophenyl) O-ethyl isopropylphosphoramidothioate, halauxifen, halauxifen-methyl, halosafen, halosulfuron, halosulfuron-methyl, haloxyfop, haloxyfop-P haloxyfop-ethoxyethyl, haloxyfop-P-ethoxyethyl, haloxyfop-methyl, haloxyfop-P-methyl, hexazinone, HW-02, i.e. 1-(dimethoxyphosphoryl) ethyl-(2,4-dichlorophenoxy)acetate, 4-hydroxy-1-methoxy-5-methyl-3-[4-(trifluormethyl)pyridine-2-yl]imidazolidine-2-on, 4-hydroxy-1-methyl-3-[4-(trifluormethyl)pyridine-2-yl]imidazolidine-2-on, (5-hydroxy-1-methyl-1H-pyrazol-4-yl) (3,3,4-trimethyl-1,1-dioxido-2,3-dihydro-1-benzothiophen-5-yl)methanon, 6-[(2-hydroxy-6-oxocyclohex-1-en-1-yl)carbonyl]-1,5-dimethyl-3-(2-methylphenyl)chinazolin-2,4(1H,3H)-dion, imazamethabenz, imazamethabenz-methyl, imazamox, imazamox-ammonium, imazapic, imazapic-ammonium, imazapyr, imazapyr-isopropylammonium, imazaquin, imazaquin-ammonium, imazethapyr, imazethapyr-immonium, imazosulfuron, indanofan, indaziflam, iodosulfuron, iodosulfuron-methyl-sodium, ioxynil, ioxynil-octanoate, -potassium and -sodium, ipfencarbazone, isoproturon, isouron, isoxaben, isoxaflutole, karbutilate, KUH-043, i.e. 3-({[5-(difluoromethyl)-1-methyl-3-(trifluoromethyl)-1H-pyrazol-4-yl]methyl}sulfonyl)-5,5-dimethyl-4,5-dihydro-1,2-oxazole, ketospiradox, lactofen, lenacil, linuron, MCPA, MCPA-butotyl, -dimethylammonium, -2-ethylhexyl, -isopropylammonium, -potassium, and -sodium, MCPB, MCPB-methyl, -ethyl and -sodium, mecoprop, mecoprop-sodium, and -butotyl, mecoprop-P, mecoprop-P-butotyl, -dimethylammonium, -2-ethylhexyl, and -potassium, mefenacet, mefluidide, mesosulfuron, mesosulfuron-methyl, mesotrione, methabenzthiazuron, metam, metamifop, metamitron, metazachlor, metazosulfuron, methabenzthiazuron, methiopyrsulfuron, methiozolin, 2-({2-[(2-methoxyethoxy) methyl]-6-(trifluormethyl) pyridin-3-yl}carbonyl)cyclohexan-1,3-dion, methyl isothiocyanate, 1-methyl-4-[(3,3,4-trimethyl-1,1-dioxido-2,3-dihydro-1-benzothiophen-5-yl) carbonyl]-1H-pyrazol-5-ylpropan-1-sulfonat, metobromuron, metolachlor, 5-metolachlor, metosulam, metoxuron, metribuzin, metsulfuron, metsulfuron-methyl, molinat, monolinuron, monosulfuron, monosulfuron-ester, MT-5950, i.e. N-(3-chloro-4-isopropylphenyl)-2-methylpentan amide, NGGC-011, napropamide, NC-310. i.e. [5-(benzyloxy)-1-methyl-1H-pyrazol-4-yl](2,4-dichlorophenyl)methanone, neburon, nicosulfuron, nonanoic acid (pelargonic acid), norflurazon, oleic acid (fatty acids), orbencarb, orthosulfamuron, oryzalin, oxadiargyl, oxadiazon, oxasulfuron, oxaziclomefon, oxyfluorfen, paraquat, paraquat dichloride, pebulate, pendimethalin, penoxsulam, pentachlorphenol, pentoxazone, pethoxamid, petroleum oils, phenmedipham, picloram, picolinafen, pinoxaden, piperophos, pretilachlor, primisulfuron, primisulfuron-methyl, prodiamine, profoxydim, prometon, prometryn, propachlor, propanil, propaquizafop, propazine, propham, propisochlor, propoxycarbazone, propoxycarbazone-sodium, propyrisulfuron, propyzamide, prosulfocarb, prosulfuron, pyraclonil, pyraflufen, pyraflufen-ethyl, pyrasulfotole, pyrazolynate (pyrazolate), pyrazosulfuron, pyrazosulfuron-ethyl, pyrazoxyfen, pyribambenz, pyribambenz-isopropyl, pyribambenz-propyl, pyribenzoxim, pyributicarb, pyridafol, pyridate, pyriftalid, pyriminobac, pyriminobac-methyl, pyrimisulfan, pyrithiobac, pyrithiobac-sodium, pyroxasulfone, pyroxsulam, quinclorac, quinmerac, quinoclamine, quizalofop, quizalofop-ethyl, quizalofop-P, quizalofop-P-ethyl, quizalofop-P-tefuryl, QYM-201, QYR-301, rimsulfuron, saflufenacil, sethoxydim, siduron, simazine, simetryn, SL-261, sulcotrion, sulfentrazone, sulfometuron, sulfometuron-methyl, sulfosulfuron, SYN-523, SYP-249, i.e. 1-ethoxy-3-methyl-1-oxobut-3-en-2-yl 5-[2-chloro-4-(trifluoromethyl)phenoxy]-2-nitrobenzoate, SYP-300, i.e. 1-[7-fluoro-3-oxo-4-(prop-2-yn-1-yl)-3,4-dihydro-2H-1,4-benzoxazin-6-yl]-3-propyl-2-thioxoimidazolidine-4,5-dione, 2,3,6-TBA, TCA (trichloroacetic acid), TCA-sodium, tebuthiuron, tefuryltrione, tembotrione, tepraloxydim, terbacil, terbucarb, terbumeton, terbuthylazin, terbutryn, tetflupyrolimet, thenylchlor, thiazopyr, thiencarbazone, thiencarbazone-methyl, thifensulfuron, thifensulfuron-methyl, thiobencarb, tiafenacil, tolpyralate, topramezone, tralkoxydim, triafamone, tri-allate, triasulfuron, triaziflam, tribenuron, tribenuron-methyl, triclopyr, trictazine, trifloxysulfuron, trifloxysulfuron-sodium, trifludimoxazin, trifluralin, triflusulfuron, triflusulfuron-methyl, tritosulfuron, urea sulfate, vernolate, ZJ-0862, i.e. 3,4-dichloro-N-{2-[(4,6-dimethoxypyrimidin-2-yl)oxy]benzyl}aniline.

Preferred are the herbicide combinations (A)+(B) comprising one or more of the compounds of formula (I) or salt thereof (=herbicides (A)) with herbicides (B) selected from the group consisting of, for example, the carbamates, thiocarbamates, haloacetanilides, substituted phenoxy-, naphthoxy- and phenoxyphenoxycarboxylic acid derivatives and heteroaryloxyphenoxyalkanecarboxylic acid derivatives, such as quinolyloxy-, quinoxalyloxy-, pyridyloxy-, benzoxazolyloxy- and benzothiazolyloxyphenoxyalkanecarboxylic acid esters, cyclohexanedione oximes, benzoylcyclohexanediones, benzoylisoxazoles, benzoylpyrazoles, imidazolinones, pyrimidinyloxypyridinecarboxylic acid derivatives, pyrimidyloxybenzoic acid derivatives, sulfonylureas, sulfonylaminocarbonyltriazolinones, triazolopyrimidinesulfonamide derivatives, phosphinic acid derivatives and salts thereof, glycine derivatives, triazolinones, triazinones and also S—(N-aryl-N-alkylcarbamoylmethyl)dithiophosphoric esters, pyridinecarboxylic acids, pyridines, pyridinecarboxamides, 1,3,5-triazines and others.

Preference is given here to phenoxyphenoxy- and heteroaryloxyphenoxycarboxylic acid esters and salts, cyclohexanedione oximes, benzoylcyclohexanediones, benzoylisoxazoles, benzoylpyrazoles, sulfonylureas, sulfonylaminocarbonyltriazolinones, imidazolinones and mixtures of the active compounds mentioned with one another and/or with active compounds used for broadening the activity spectrum of the herbicides, for example bentazone, cyanazine, atrazine, bromoxynil, dicamba and other leaf-acting herbicides.

Preferred are the herbicide combinations (A)+(B) comprising a compound of the formula (I) or a salt thereof, or one or more of the compounds of formula (I) or salt thereof, with a herbicide (B) or herbicides (B) each selected from the group consisting of:

(B1) 2,4-D and esters and salts thereof,
(B2) Amicarbazone
(B3) Amidosulfuron or salts thereof, such as (B3.1) Amidosulfuron,
(B4) Aminocyclopyrachlor or salts or esters thereof, such as (B4.1) Aminocyclopyrachlor,
(B4.2) Aminocyclopyrachlor-methyl,
(B5) Aminopyralid or salts thereof, such as (B5.1) Aminopyralid,
(B6) Bentazon
(B7) Bromoxynil or esters thereof, such as (B7.1) Bromoxynil, (B7.2) Bromoxynil-heptanoate,
(B7.3) Bromoxynil-octanoate,
(B8) Carfentrazone and esters and salts thereof, such as (8.1) Carfentrazone, (8.2) Carfentrazone-ethyl,
(B9) Chlorsulfuron
(B10 Dicamba and esters and salts thereof, such as (10.1) Dicamba, (10.2) Dicamba-sodium, (10.3) Dicamba-potassium, (10.4) Dicamba-dimethylammonium, (10.5) Dicamba-isopropylammonium, (10.5) Dicamba-diglycolamin salt, 10.4) Dicamba-butotyl,
(B11) Diflufenican,
(B12) Dimethenamid
(B13) Dithiopyr
(B14) Ethofumesate,
(B15) Ethoxysulfuron or salts thereof, such as (B15.1) Ethoxysulfuron, (B15.2) Ethoxysulfuron-sodium,
(B16) Flazasulfuron
(B17) Florpyrauxifen
(B18) Fluroxypyr or esters thereof, such as (B18.1) Fluroxypyr, (B18.2) Fluroxypyr-meptyl, (B18.3) Fluroxypyr-2-butoxy-1-methylethyl,
(B19) Florasulam
(B20) Foramsulfuron and esters and salts thereof, such as (20.1) Foramsulfuron,
(B21) Fatty acids, such as fatty acids having 1 to 16 carbon atom, such as (B21.1) acetic acid, (B21.2) propionic acid, (B21.3) butanoic acid, (B21.4) pentanoic acid, (B21.5) hexanoic acid, (B21.6) heptanoic acid, (B21.7) octanoic acid, (B21.8) nonanoic acid, (B21.9) decanoic acid, (B21.10) undecanoic acid, (B21.11) dodecanoic acid, preferably $C_8$-$C_{12}$-fatty acids, more preferably (B21.8) nonanoic acid and (B21.9) decanoic acid,
(B22) Glufosinate or salts thereof, such as (B22.1) Glufosinate, (B22.2) Glufosinate-ammonium, (B22.3) Glufosinate-sodium,
(B23) Glufosinate-P (=L-Glufosinate or phosphinothricin) or salts thereof, such as (B23.1) Glufosinate-P, (B23.2) Glufosinate-P-sodium, (B23.3) Glufosinate-P-ammonium,
(B24) Glyphosate or salts thereof, such as (B24.1) Glyphosate, (B24.2) Glyphosate-sodium, (B24.3) Glyphosate-potassium, (B.4) Glyphosate-ammonium, (B.5) Glyphosate-diammonium, (B24.6) Glyphosate-isopropylammonium,
(B25) Halauxifen
(B26) Halosulfuron
(B27) Indaziflam
(B28) Iodosulfuron and esters and salts thereof, such as (B28.1) Iodosulfuron, (B28.2) Iodosulfuron-methyl, (B28.3) Iodosulfuron-methyl-sodium,
(B29) Ipfencarbazone
(B30) Isoxaflutole
(B31) Mecoprop and Mecoprop-P, and esters and salts thereof, such as (31.1) Mecoprop and esters and salts thereof, (31.2) Mecoprop-P and esters and salts thereof. (31.3) Mecoprop, (31.4) Mecoprop-P, (31.5) Mecoprop-sodium, (31.6) Mecoprop-butotyl, (31.7) Mecoprop-P, (31.8) Mecoprop-P-sodium, (31.9) Mecoprop-P-potassium, (31.10) Mecoprop-P-butotyl, (31.11) Mecoprop-P-2-ethyl-hexyl
(B32) Mesosulfuron and esters or salts thereof, such as (B32.1) Mesosulfuron, (B32.2) Mesosulfuron-methyl,
(B33) Mesotrione
(B34) Metosulam,
(B35) Metsulfuron and esters and salts thereof, such as (35.1) Metsulfuron, (35.2) Metsulfuron-methyl,
(B36) Oxadiazone and salts thereof, such as (36.1) Oxadiazon,
(B37) Paraquat and salts thereof, such as (B37.1) Paraquat-dichloride,
(B38) Pendimethalin
(B39) Penoxsulam and salts thereof, such as (B39.1) Penoxsulam,
(B40) Picloram and esters and salts thereof, such as (B40.1) Picloram, (B40.2) Picloram-potassium, (B40.3) Picloram-dimethylammonium, (B40.4) Picloram-triisopropylammonium, (B40.5) Picloram-triethanolammonium, (B40.6) Picloram-triisopropanolammonium, (B40.7) Picloram-isooctyl,
(B41) Prodiamine
(B42) Pyrasulfotole and salts thereof, such as (B20.1) Pyrasulfotole,
(B43) Pyrimisulfan
(B44) Pyroxasulfone (KIH-485) and salts thereof, such as (B44.1) Pyroxasulfone,
(B45) Pyroxsulam and salts thereof, such as (B45.1) Pyroxulam,
(B46) Rimsulfuron and salts thereof, such as (B46.1) Rimsulfuron,
(B47) Saflufenacil and salts thereof, such as (B47.1) Saflufenacil,
(B48) *Sclerotinia* (biological herbicides), (B49) Sulfentrazone and salts thereof, such as (49.1) Sulfentrazone,
(B50) Sulfosulfuron
(B51) SYN-449 and salts thereof, such as (B51.1) SYN-449, i.e. 4-Hydroxy-3-[[2-[(2-methoxy-ethoxy)-methyl]-6-trifluoromethyl-3-pyridinyl]-carbonyl]-bicyclo [3.2.1]oct-3-en-2-on,
(B52) SYN-523 and salts thereof, such as (B58.1) SYN-523, i.e. [[3-[2-Chlor-5-[3,6-dihydro-3-methyl-2,6-dioxo-4-(trifluormethyl)-1(2H)-pyrimidinyl]-4-fluorphenoxy]-2-pyridinyl]oxy]-acetic acidethylester,
(B53) Tembotrione and salts thereof, such as (B53.1) Tembotrione,
(B54) Tetflupyrolimet
(B55) Thiencarbazone and esters and salts thereof, such as (B55.1) Thiencarbazone, (B55.2) Thiencarbazone-methyl, (B55.3) Thiencarbazone-methyl-sodium,
(B56) Thifensulfuron and esters and salts thereof, such as (B56.1) Thifensulfuron, (B56.2) Thifensulfuron-methyl, (B56.3) Thifensulfuron-methyl-sodium,
(B57) Tiafenacil
(B58) Topramezone
(B59) Tribenuron and esters and salts thereof, such as (B59.1) Tribenuron, (B59.2) Tribenuron-methyl, (B59.3) Tribenuron-methyl-sodium,
(B60) Trifloxysulfuron and salts thereof, such as (B60.1) Trifloxysulfuron, (B60.2) Trifloxysulfuron-sodium,
(B61) Trifludimoxazin
(B62) MCPA and esters and salts thereof, such as (62.1) MCPA, (62.2) MCPA-sodium, (62.3) MCPA-potassium, (62.4) MCPA-dimethylammonium, (62.5) Mecoprop-P-2-ethyl-hexyl,
(B63) Fenoxaprop and esters and salts thereof, such as (63.1) Fenoxaprop, (63.2) Fenoxaprop-ethyl,
(B64) Fenoxaprop-P, and esters and salts thereof, such as (64.1) Fenoxaprop-P, (64.2) Fenoxaprop-P-ethyl,
(B65) Triclopyr and esters and salts thereof, such as (65.1) Triclopyr, (65.2) Triclopyr-triethylammonium, (65.3) Triclopyr-butotyl,
(B66) Metribuzin or salts thereof, preferably Metribuzin (B66.1),
(B67) pronamide, and
(B68) Simazine.

It is more preferred that the herbicide combinations (A)+(B) comprise a compound of the formula (I) or a salt thereof, or one or more of the compounds of formula (I) or salt thereof, with a herbicide (B) or herbicides (B) each selected from the group consisting of:

(B1) 2,4-D and esters and salts thereof,
(B2) Amicarbazone
(B4) Aminocyclopyrachlor or salts or esters thereof, such as (B4.1) Aminocyclopyrachlor, (B4.2) Aminocyclopyrachlor-methyl,
(B5) Aminopyralid or salts thereof, such as (B5.1) Aminopyralid,
(B6) Bentazon
(B8) Carfentrazone and esters and salts thereof, such as (8.1) Carfentrazone, (8.2) Carfentrazone-ethyl,
(B9) Chlorsulfuron
(B10 Dicamba and esters and salts thereof, such as (10.1) Dicamba, (10.2) Dicamba-sodium, (10.3) Dicamba-potassium, (10.4) Dicamba-dimethylammonium, (10.5) Dicamba-isopropylammonium, (10.5) Dicamba-diglycolamin salt, 10.4) Dicamba-butotyl,
(B11) Diflufenican,
(B12) Dimethenamid
(B13) Dithiopyr
(B16) Flazasulfuron
(B17) Florpyrauxifen
(B18) Fluroxypyr or esters thereof, such as (B18.1) Fluroxypyr, (B18.2) Fluroxypyr-meptyl, (B18.3) Fluroxypyr-2-butoxy-1-methylethyl,
(B19) Florasulam
(B20) Foramsulfuron and esters and salts thereof, such as (20.1) Foramsulfuron,
(B24) Glyphosate or salts thereof, such as (B24.1) Glyphosate, (B24.2) Glyphosate-sodium, (B24.3) Glyphosate-potassium, (B24.4) Glyphosate-ammonium, (B24.5) Glyphosate-diammonium, (B24.6) Glyphosate-isopropylammonium,
(B25) Halauxifen
(B26) Halosulfuron
(B27) Indaziflam
(B28) Iodosulfuron and esters and salts thereof, such as (B28.1) Iodosulfuron, (B28.2) Iodosulfuron-methyl, (B28.3) Iodosulfuron-methyl-sodium,
(B29) Ipfencarbazone
(B30) Isoxaflutole
(B31) Mecoprop and Mecoprop-P, and esters and salts thereof, such as (31.1) Mecoprop and esters and salts thereof, (31.2) Mecoprop-P and esters and salts thereof. (31.3) Mecoprop, (31.4) Mecoprop-P, (31.5) Mecoprop-sodium, (31.6) Mecoprop-butotyl, (31.7) Mecoprop-P, (31.8) Mecoprop-P-sodium, (31.9) Mecoprop-P-potassium, (31.10) Mecoprop-P-butotyl, (31.11) Mecoprop-P-2-ethyl-hexyl
(B33) Mesotrione
(B35) Metsulfuron and esters and salts thereof, such as (35.1) Metsulfuron, (35.2) Metsulfuron-methyl,
(B36) Oxadiazone and salts thereof, such as (36.1) Oxadiazon,
(B38) Pendimethalin
(B39) Penoxsulam and salts thereof, such as (B39.1) Penoxsulam,
(B41) Prodiamine
(B43) Pyrimisulfan
(B46) Rimsulfuron and salts thereof, such as (B46.1) Rimsulfuron,
(B49) Sulfentrazone and salts thereof, such as (49.1) Sulfentrazone,
(B50) Sulfosulfuron
(B54) Tetflupyrolimet
(B55) Thiencarbazone and esters and salts thereof, such as (B55.1) Thiencarbazone, (B55.2) Thiencarbazone-methyl, (B55.3) Thiencarbazone-methyl-sodium,
(B57) Tiafenacil
(B58) Topramezone
(B60) Trifloxysulfuron and salts thereof, such as (B60.1) Trifloxysulfuron, (B60.2) Trifloxysulfuron-sodium,
(B61) Trifludimoxazin,
(B67 Pronamide, and
(B68) Simazine.

It is most preferred that herbicide (B) is (B27) indaziflam or (B55.2) Thiencarbazone-methyl.

Some of said compounds may belong to the same structural type or same type of mode of action or both. In such cases herbicidal properties of combinations (A) with other herbicides (B) are similar if these herbicides belong to the same structural type and/or mode of action compared with the herbicidal combinations (A)+(B) specifically mentioned above and below.

Salts are generally agriculturally applicable salts, preferably metal salts such as alkaline metal salts, or optionally substituted ammonium salts, such as ammonium salts, mono-, di- or tri-alkyl or -hydroxyalkylammonium salts.

The combination herbicides are described in the references mentioned above (Pesticide Manual etc.); other references are provided in the following:

Preferred are combinations of a compound (A) selected from the list of compounds of table 1 (compounds A1 to A127) and a herbicide (B) as follows:

(A) + (B1), (A) + (B2), (A) + (B4), (A) + (B4.1), (A) + (B5), (A) + (B5.1), (A) + (B6), (A) + (B8), (A) + (B8.1), (A) + (B9), (A) + (B10), (A) + (B10.1), (A) + (B11), (A) + (B12), (A) + (B13), (A) + (B16), (A) + (B17), (A) + (B18), (A) + (B18.1), (A) + (B19), (A) + (B20), (A) + (20.1), (A) + (B24), (A) + (B24.1), (A) + (B24.2), (A) + (B24.3), (A) + (B24.4), (A) + (B24.5), (A) + (B24.6), (A) + (B25), (A) + (B26), (A) + (B27), (A) + (B28), (A) + (B28.1), (A) + (B29), (A) + (B30), (A) + (B31), (A) + (B31.2), (A) + (B31.4), (A) + (B33), (A) + (B35), (A) + (B35.1), (A) + (B36), (A) + (B36.1), (A) + (B38), (A) + (B39), (A) + (B39.1), (A) + (B41), (A) + (B43), (A) + (B46), (A) + (B46.1), (A) + (B49), (A) + (B149.1), (A) + (B50), (A) + (B54), (A) + (B55), (A) + (B55.2), (A) + (B57), (A) + (B58), (A) + (B60), (A) + (B60.1), (A) + (B61), (A) + (B67), or (A) + (B68),.

More preferred combinations (A)+(B) are selected from the above combinations wherein (A) is a compound from table 1 having the number (A1.26), (A1.36) and (A1.68), and mixtures and/or salts thereof.

Even more preferred combinations of herbicide (A) and herbicide (B) are selected from:

(A1.68) + (B1), (A1.68) + (B2), (A1.68) + (B4), (A1.68) + (B4.1), (A1.68) + (B5), (A1.68) + (B5.1), (A1.68) + (B6), (A1.68) + (B8), (A1.68) + (B8.1), (A1.68) + (B9), (A1.68) + (B10), (A1.68) + (B10.1), (A1.68) + (B11), (A1.68) + (B12), (A1.68) + (B13), (A1.68) + (B16), (A1.68) + (B17), (A1.68) + (B18), (A1.68) + (B18.1), (A1.68) + (B19), (A1.68) + (B20), (A1.68) + (20.1), (A1.68) + (B24), (A1.68) + (B24.1), (A1.68) + (B24.2), (A1.68) + (B24.3), (A1.68) + (B24.4), (A1.68) + (B24.5), (A1.68) + (B24.6), (A1.68) + (B25), (A1.68) + (B26), (A1.68) + (B27), (A1.68) + (B28), (A1.68) + (B28.1), (A1.68) + (B29), (A1.68) + (B30), (A1.68) + (B31), (A1.68) + (B31.2), (A1.68) + (B31.4), (A1.68) + (B33), (A1.68) + (B35), (A1.68) + (B35.1), (A1.68) + (B36), (A1.68) + (B36.1), (A1.68) + (B38), (A1.68) + (B39), (A1.68) + (B39.1), (A1.68) + (B41), (A1.68) + (B43), (A1.68) + (B46), (A1.68) + (B46.1), (A1.68) + (B49), (A1.68) + (B149.1), (A1.68) + (B50), (A1.68) + (B54), (A1.68) + (B55), (A1.68) + (B55.2), (A1.68) + (B57), (A1.68) + (B58), (A1.68) + (B60), (A1.68) + (B60.1), (A1.68) + (B61), (A1.68) + (B67), or (A1.68) + (B68).

Most preferred are combinations (A1.68)+(B27) and (A1.68)+(B55.2).

Preferred combinations (A)+(B) are selected from the above combinations wherein (A) is a compound from table 1 having the number (A1), (A2), (A3), (A4), (A5), (A6), (A7), (A8), (A9), (A10), (A11), (A13), (A16), (A17), (A18), (A19), (A21), (A22), (A23), (A24), (A25), (A26), (A28), (A29), (A30), (A31), (A32), (A33), (A34), (A35), (A36), (A37), (A38), (41), (A42), (A43), (A44), (A53), (A54), (A55), (A56), (A63), (A65), (A66) or (A69) having an optical purity corresponding to 60 to 100% (R)-isomer or isomers, preferably of from 70 to 100% (R)-isomer(s), more preferably of from 80 to 100% (R)-isomer(s), in each case relative to the total amount the stereoisomer(s) having (R)- and (S)-configuration at the position marked 1 in formula (I).

The weight ratio of Compounds (A) to pesticide can be varied within wide limits, and its optimum weight ratio depends both on the Compounds (A) and pesticide employed and on the kind of useful plants to be treated. The ratio by weight of compound(s) (A) to compound(s) (B) is, for example, 1000:1 to 1:1000, preferably 200:1 to 1:200, in particular 100:1 to 1:100.

If the compounds are combined with other herbicidal active ingredients (B) the practical application rates of herbicides (A) may generally be reduced.

The combined application rates of compounds (A)+(B) are preferably within the range of from 0.01 to 3000 g a.i./ha, more particularly of from 0.02 to 1000 g a.i./ha.

Therefore, another object of the invention is the advantageous use of the above combinations for enhancing quality of turf or lawn. The combinations are valuable because they do not damage the turf grass substantially, preferably when the turf grasses belong to an established turf or lawn.

In many cases the combinations are surprisingly as selective as or even better selective in turf or lawn than the compounds (A) or (B) alone.

Another advantageous property found for the combination according to the invention of herbicides (A) and (B) is that the active compounds (A) and (B) are compatible with one another, i.e. they can be used together without substantial chemical incompatibilities of the active compounds (A) and/or (B) resulting in a decomposition of one or more active compounds. A reduction of the active compound content in formulations or spray liquors is thus avoided. The favorable compatibility also extends to the biological properties of the active compounds when applied in combination. Thus, antagonistic effects in the control of harmful plants are generally not observed with the active compound combinations according to the invention. Accordingly, the active compounds (A) and (B) are particularly suitable for joint application or application additionally with further active crop protection agents or agrochemicals. The possible combined application allows advantageous effects to be utilized, such as, for example, a further increase in lawn or turf quality, a reduction of the application rate of the individual compounds (A) and/or (B) compared to the respective application rate of the compound in question in an individual application. Thus, the degradation properties of the active compounds can be influenced, and more favorable conditions for the replanting of crop plants can be achieved. A further advantage, for the case that both compounds (A) and (B) are also active as herbicides, consists in the fact that the development of resistances of harmful plants to the active compounds can frequently be reduced substantially or avoided by combinations of active compounds having a different mechanism of action.

In particular, surprisingly, there are also superadditive (=synergistic) effects in the combined application of the active compounds (A) and (B) with a relatively large number of economically important harmful plants or with regard to improved lawn or turf quality. Here, the activity of the combination is stronger than the expected sum of the activities of the individual compounds employed.

The synergistic effects allow the application rate to be reduced further, a broader spectrum of broad-leaved weeds and weed grasses to be controlled (for both compounds (A) and (B) being herbicides), a more rapid onset of the herbicidal action, a longer persistency, a better control of the harmful plants with only one or a few applications and a widening of the application period possible. To some extent, by using the compositions, the amount of harmful ingredients, such as nitrogen or oleic acid, and their introduction into the soil are also likewise reduced.

The above-mentioned properties and advantages are desired for weed control practice to not only keep turf and/or lawn free of unwanted competing plants but also to improve turf and/or lawn quality, and thus to ensure and/or increase yield levels from the qualitative and quantitative angle. These novel combinations markedly exceed the technical state of the art with a view to the properties described.

The synergistic effects are observed when the active compounds (A) and (B) are applied together; however, they may frequently also occur when the compounds are applied as a split application over time. Another possibility is the application of the compounds (A) or (B) or the compound combinations (A) and (B) in a plurality of portions (sequential application). For example, one or more pre-emergence applications may be followed by a post-emergence application, or an early post-emergence application may be followed by applications at medium or late post-emergence. Preferred is the simultaneous or nearly simultaneous application of the active compounds of the combination in question, if appropriate in a plurality of portions. However, it is also possible to apply the individual active compounds of a combination at different times, which may be advantageous in the individual case. It is also possible to integrate other crop protection agents, such as, for example, the other active compounds mentioned (other herbicides, fungicides, insecticides, acaricides, etc.) and/or various auxiliaries, adjuvants and/or fertilizer applications in the system of application.

The herbicides (A), optionally in combination with herbicides (B), can also be applied together with other type (C) active ingredients useful in the treatment of turf or lawn. Type (C) active ingredients useful in the treatment of lawn or turf can be, for instance, insecticides, acaricides, fungicides, safeners, fertilizers and/or growth regulators or nutrients useful for treating lawn or turf against phytopathogenic diseases or for growth regulation or growth promotion of lawn or turf.

The above combinations also optionally additionally, or preferably comprise safeners as components (C). Safeners are mentioned in the context of herbicidal combination partners already. Examples for safeners are:

Benoxacor, Cloquintocet (-mexyl), Cyometrinil, Cyprosulfamide, Dichlormid, Fenchlorazole (-ethyl), Fenclorim, Flurazole, Fluxofenim, Furilazole, Isoxadifen (-ethyl), Mefenpyr (-diethyl), Naphthalic anhydride, Oxabetrinil, "AD-67" oder "MON 4660" (=3-Dichloracetyl-1-oxa-3-aza-spiro [4,5]decan), "TI-35" (=1-Dichloracetyl-azepan), "Dimepiperate" oder "MY-93" (=Piperidin-1-thiocarbonsäure-S-1-methyl-1-phenylethylester), "Daimuron" oder "SK 23" (=1-(1-Methyl-1-phenylethyl)-3-p-tolyl-harnstoff), "Cumyluron"="JC-940"(=3-(2-Chlorphenylmethyl)-1-(1-methyl-1-phenyl-ethyl) harnstoff), preferably Benoxacor, Cloquintocet (-mexyl), Cyprosulfamide, Isoxadifen (-ethyl) or Mefenpyr (-diethyl).

The compounds of formula (I) or combinations with other active ingredients (A) can be formulated in various ways, depending on the prevailing biological and/or chemico-physical parameters. Examples of possible formulations which are suitable are: wettable powders (WP), water-soluble powders (SP), water-soluble concentrates, emulsifiable concentrates (EC), emulsions (EW) such as oil-in-water and water-in-oil emulsions, sprayable solutions, suspension concentrates (SC), dispersions on an oil or water basis, solutions which are miscible with oil, capsule suspensions (CS), dusts (DP), seed-dressing products, granules for broadcasting and soil application, granules (GR) in the form of microgranules, spray granules, coated granules and adsorption granules, water-dispersible granules (WG), water-soluble granules (SG), ULV formulations, microcapsules and waxes.

These individual formulation types are known in principle and described, for example, in: Winnacker-Küchler, "Chemische Technologie" [Chemical Technology], Volume 7, C. Hanser Verlag, Munich, 4th Edition 1986; Wade van Valkenburg, "Pesticide Formulations", Marcel Dekker, N.Y., 1973; K. Martens, "Spray Drying Handbook", 3rd Ed. 1979, G. Goodwin Ltd. London.

The necessary formulation auxiliaries such as inert materials, surfactants, solvents and other additives are also known and described, for example, in: Watkins, "Handbook of Insecticide Dust Diluents and Carriers", 2nd Ed., Darland Books, Caldwell N.J.; H.v. Olphen, "Introduction to Clay Colloid Chemistry", 2nd Ed., J. Wiley & Sons, N.Y.; C. Marsden, "Solvents Guide", 2nd Ed., Interscience, N. Y. 1963; Mccutcheon's "Detergents and Emulsifiers Annual", MC Publ. Corp., Ridgewood N.J.; Sisley and Wood, "Encyclopedia of Surface Active Agents", Chem. Publ. Co. Inc., N.Y. 1964; Schönfeldt, "Grenzflächenaktive Äthylenoxidaddukte" [Surface-active ethylene oxide adducts], Wiss. Verlagsgesell., Stuttgart 1976; Winnacker-Küchler, "Chemische Technologie" [Chemical Technology], Volume 7, C. Hanser Verlag, Munich, 4th Ed. 1986.

Based on these formulations, it is also possible to prepare combinations with other pesticidally active or plant strengthening substances (B) such as, for example, insecticides, acaricides, herbicides, fungicides, and with safeners, fertilizers and/or growth regulators, for example in the form of a readymix or a tank mix.

Wettable powders are preparations which are uniformly dispersible in water and which, besides the compounds of formula (I), also comprise ionic and/or nonionic surfactants (wetters, dispersants), for example, polyoxyethylated alkylphenols, polyoxyethylated fatty alcohols, polyoxyethylated fatty amines, fatty alcohol polyglycol ether sulfates, alkanesulfonates or alkylbenzenesulfonates, sodium lignosulfonate, sodium 2,2'-dinaphthylmethane-6,6'-disulfonate, sodium dibutylnaphthalenesulfonate or else sodium oleoylmethyltaurinate, in addition to a diluent or inert substance. To prepare the wettable powders, the compounds of formula (I) are, for example, ground finely in conventional apparatuses such as hammer mills, blower mills and air-jet mills and mixed with the formulation auxiliaries, either concomitantly or thereafter.

Emulsifiable concentrates are prepared, for example, by dissolving the compounds of formula (I) in an organic solvent, for example butanol, cyclohexanone, dimethylformamide, xylene or else higher-boiling aromatics or hydrocarbons or mixtures of these, with addition of one or more ionic and/or nonionic surfactants (emulsifiers). Emulsifiers which can be used are, for example: calcium salts of alkylarylsulfonic acids, such as calcium dodecylbenzenesulfonate or nonionic emulsifiers, such as fatty acid polyglycol esters, alkylaryl polyglycol ethers, fatty alcohol polyglycol ethers, propylene oxide/ethylene oxide condensates, alkyl polyethers, sorbitan esters such as sorbitan fatty acid esters or polyoxyethylene sorbitan esters such as polyoxyethylene sorbitan fatty acid esters.

Dusts are obtained by grinding the active substance with finely divided solid substances, for example talc or natural clays, such as kaolin, bentonite or pyrophyllite, or diatomaceous earth.

Suspension concentrates may be water- or oil-based. They can be prepared, for example, by wet grinding by means of commercially available bead mills, if appropriate with addition of surfactants, as they have already been mentioned above for example in the case of the other formulation types.

Emulsions, for example oil-in-water emulsions (EW), can be prepared for example by means of stirrers, colloid mills and/or static mixtures using aqueous organic solvents and, if appropriate, surfactants as they have already been mentioned above for example in the case of the other formulation types.

Granules can be prepared either by spraying the compounds of formula (I) onto adsorptive, granulated inert material or by applying active substance concentrates onto the surface of carriers such as sand, kaolinites or of granulated inert material, by means of binders, for example polyvinyl alcohol, sodium polyacrylate or alternatively mineral oils. Suitable active substances can also be granulated in the manner which is conventional for the production of fertilizer granules, if desired in a mixture with fertilizers.

Water-dispersible granules are prepared, as a rule, by the customary processes such as spray-drying, fluidized-bed granulation, disk granulation, mixing in high-speed mixers and extrusion without solid inert material. To prepare disk, fluidized-bed, extruder and spray granules, see, for example, processes in "Spray-Drying Handbook" 3rd ed. 1979, G. Goodwin Ltd., London; J. E. Browning, "Agglomeration", Chemical and Engineering 1967, pages 147 et seq.; "Perry's Chemical Engineer's Handbook", 5th Ed., McGraw-Hill, New York 1973, p. 8-57.

For further details on the formulation of crop protection products, see, for example, G. C. Klingman, "Weed Control as a Science", John Wiley and Sons, Inc., New York, 1961, pages 81-96 and J. D. Freyer, S. A. Evans, "Weed Control Handbook", 5th Ed., Blackwell Scientific Publications, Oxford, 1968, pages 101-103.

As a rule, the agrochemical preparations comprise 0.1 to 99% by weight, in particular 0.1 to 95% by weight, of compounds of formula (I).

The concentration of compounds of formula (I) in wettable powders is, for example, approximately 10 to 90% by weight, the remainder to 100% by weight being composed of customary formulation components. In the case of emulsifiable concentrates, the concentration of compounds of formula (I) can amount to approximately 1 to 90, preferably 5 to 80% by weight. Formulations in the form of dusts usually comprise 1 to 30% by weight of compounds of formula (I), preferably in most cases 5 to 20% by weight of compounds of formula (I), while sprayable solutions comprise approximately 0.05 to 80, preferably 2 to 50% by weight of compounds of formula (I). In the case of water-dispersible granules, the content of compounds of formula (I) depends partly on whether the compounds of formula (I) are in liquid or solid form and on which granulation auxiliaries, fillers and the like are being used. The water-dispersible granules, for example, comprise between 1 and 95% by weight of active substance, preferably between 10 and 80% by weight.

In addition, the formulations of compounds of formula (I) mentioned comprise, if appropriate, the adhesives, wetters, dispersants, emulsifiers, penetrants, preservatives, antifreeze agents, solvents, fillers, carriers, colorants, antifoams, evaporation inhibitors, pH regulators and viscosity regulators which are conventional in each case.

The compounds of the formula (I) or their salts can be employed as such or in the form of their preparations (formulations) as combinations with other pesticidally active substances, such as, for example, insecticides, acaricides, nematicides, herbicides, fungicides, safeners, fertilizers and/or growth regulators, for example as a premix or as tank mixes.

FORMULATION EXAMPLES a) A dust is obtained by mixing 10 parts by weight of a compound of formula (I) and 90 parts by weight of talc as inert material and grinding the mixture in a hammer mill.

b) A wettable powder which is readily dispersible in water is obtained by mixing 25 parts by weight of a compound of formula (I), 64 parts by weight of kaolin-containing quartz as inert material, 10 parts by weight of potassium lignosulfonate and 1 part by weight of sodium oleoylmethyltaurinate as wetter and dispersant and grinding the mixture in a pinned-disk mill.

c) A dispersion concentrate which is readily dispersible in water is obtained by mixing 20 parts by weight of a compound of formula (I) with 6 parts by weight of alkylphenol polyglycol ether (®Triton X 207), 3 parts by weight of isotridecanol polyglycol ether (8 EO) and 71 parts by weight of paraffinic mineral oil (boiling range for example approx. 255 to above 277° C.) and grinding the mixture in a ball mill to a fineness of below 5 microns.

d) An emulsifiable concentrate is obtained from 15 parts by weight of a compound of formula (I), 75 parts by weight of cyclohexanone as solvent and 10 parts by weight of oxethylated nonylphenol as emulsifier.

e) Water-dispersible granules are obtained by mixing
75 parts by weight of a compound of formula (I),
10 parts by weight of calcium ligno-sulfonate,
5 parts by weight of sodium laurylsulfate,
3 parts by weight of polyvinyl alcohol and
7 parts by weight of kaolin,
grinding the mixture in a pinned disk mill and granulating the powder in a fluidized bed by spraying on water as granulation liquid.

f) Alternatively, water-dispersible granules are obtained by homogenizing and precomminuting, on a colloid mill,
25 parts by weight of a compound of formula (I),
5 parts by weight of sodium 2,2'-dinaphthylmethane-6,6'-disulfonate,
2 parts by weight of sodium oleoylmethyltaurinate,
1 part by weight of polyvinyl alcohol,
17 parts by weight of calcium carbonate and
50 parts by weight of water,
subsequently grinding the mixture on a bead mill and atomizing and drying the resulting suspension in a spray tower by means of a single-substance nozzle.

The present application comprises the following Figures:

FIG. 1: Color response of bermudagrass cv Tifway 419 to compound A1.68 rate range over a temporal course. A rate effect was observed.

Figure 2:
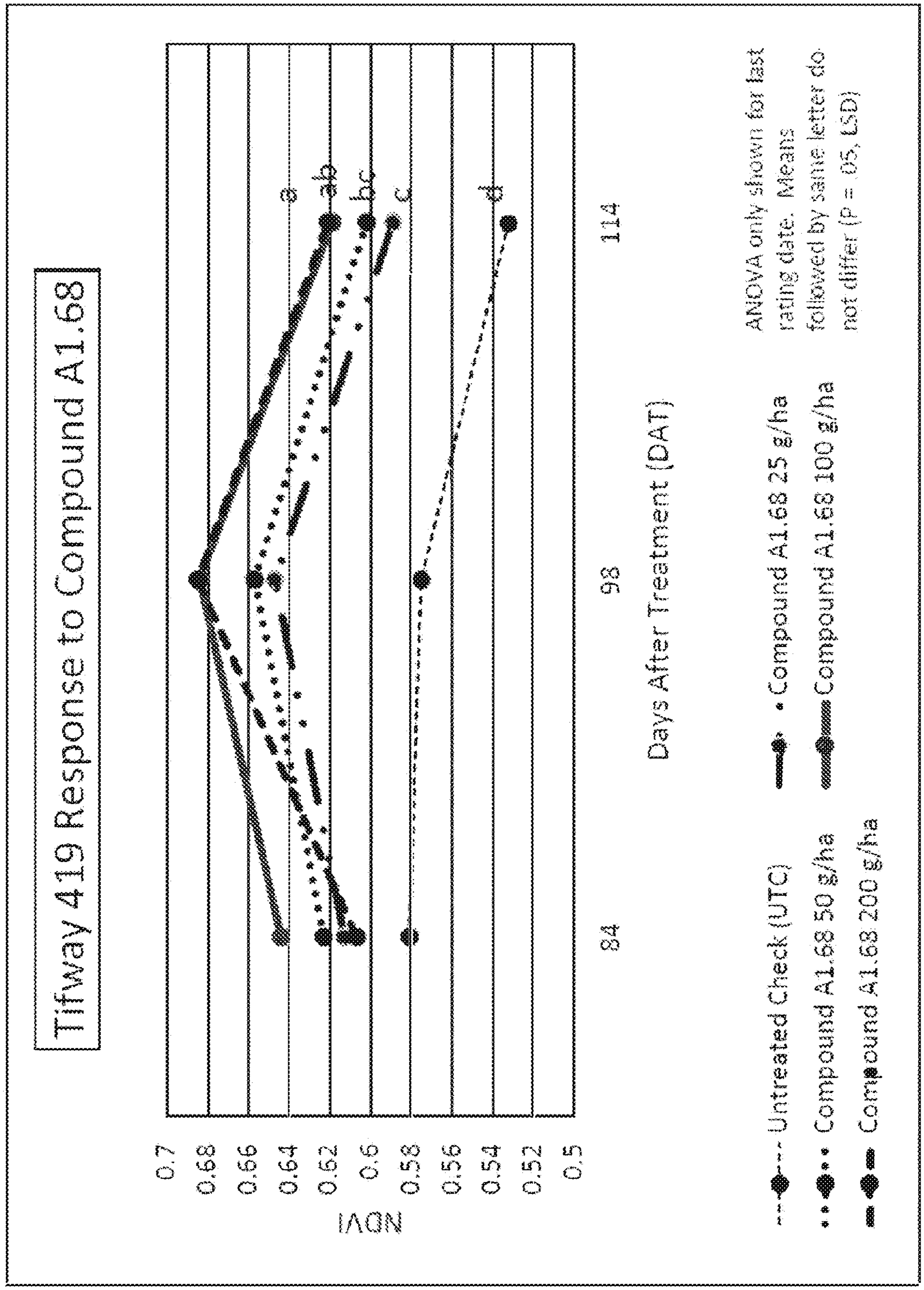

FIG. 2: Spectral reflectance (NDVI) response of bermudagrass cv Tifway 419 to compound A1.68 rate range over a temporal course. A rate effect was observed. Analysis of Variance shown only for the 114 DAT rating.

Figure 3:
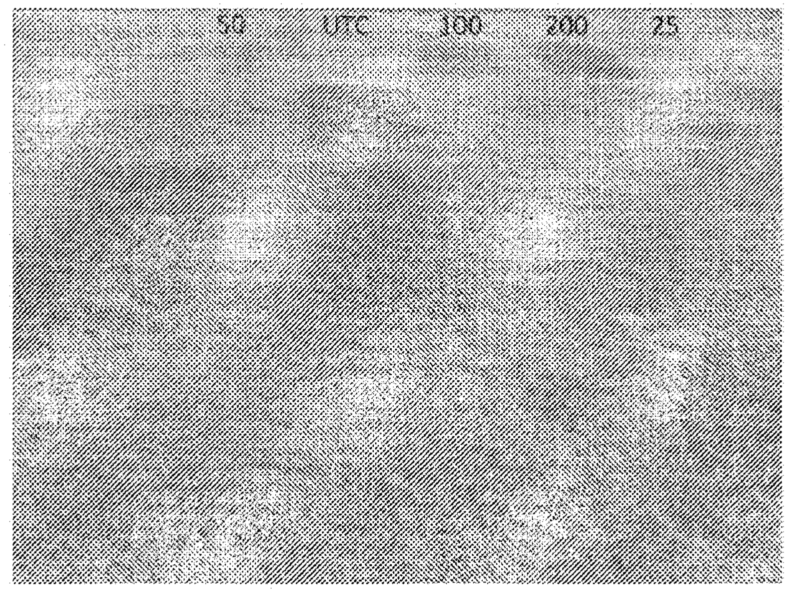

FIG. 3: Greening response of bermudagrass cv Tifway 419 to 25-200 g/ha to compound A1.68. There are total of 4 replicates (rows) in the photo. Each replicate is oriented from left to right in the photo, with the first row closest and the fourth row furthest in the photo. Each replicate consists of 1 plot per compound A1.68 rate (treatment). The treatments are randomized across the trial site according to the map on the right. For example, the treatments in the fourth replicate are labeled with the corresponding rates of compound A1.68. They are (from left to right), 50 g compound A1.68/ha, UTC (Untreated Check or 0 g compound A1.68/ha), 100 g compound A1.68/ha, 200 g compound A1.68/ha, and 25 g compound A1.68/ha This photo demonstrates a rate response i.e., the higher the rate of compound A1.68, the greater the greening response.

Figure 4:
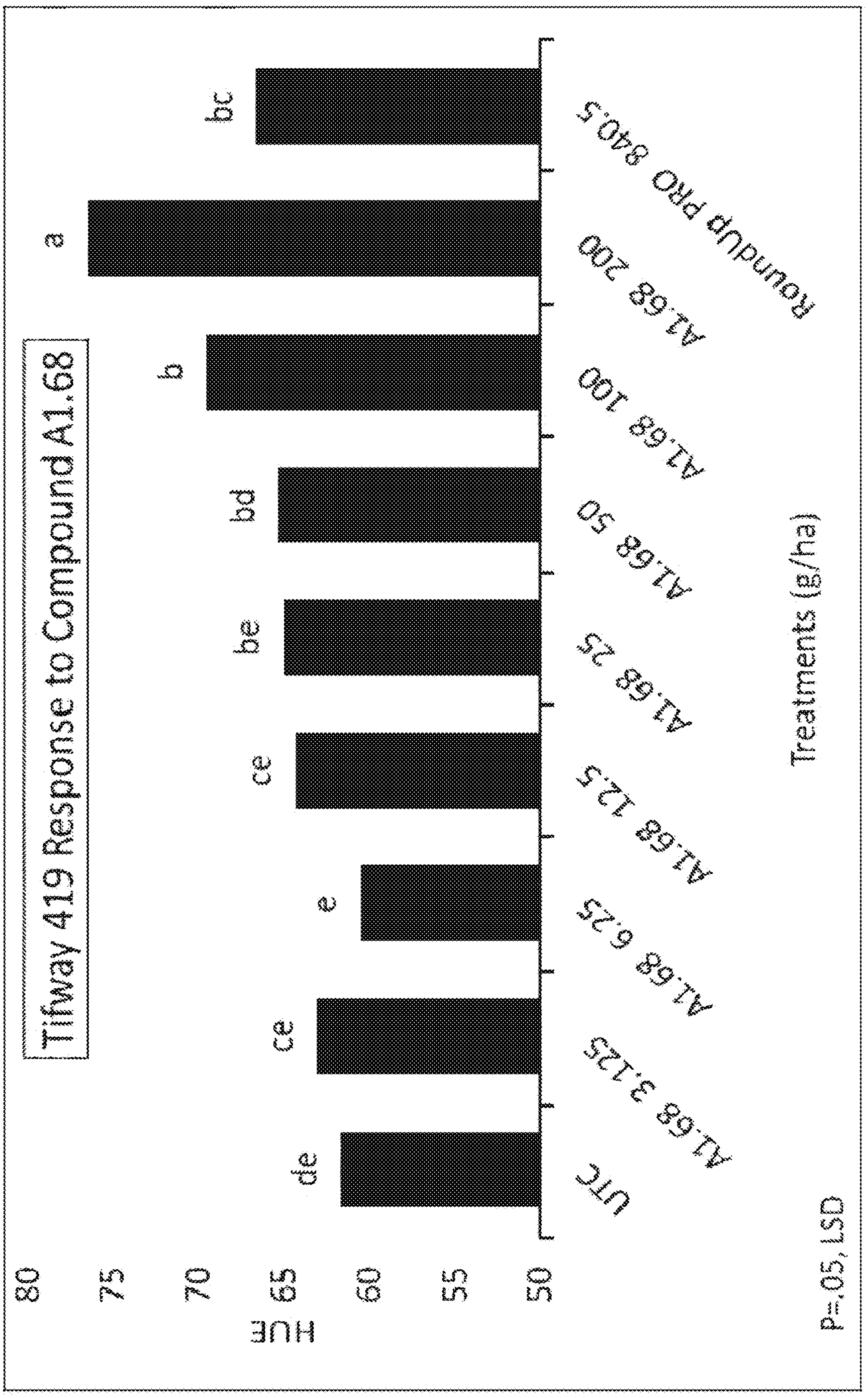

FIG. 4: Hue analysis via DIA on Tifway 419 at 28 DAT. These data show treatment separation from the UTC at 50, 100 & 200 g/ha of compound A1.68.

Figure 5:
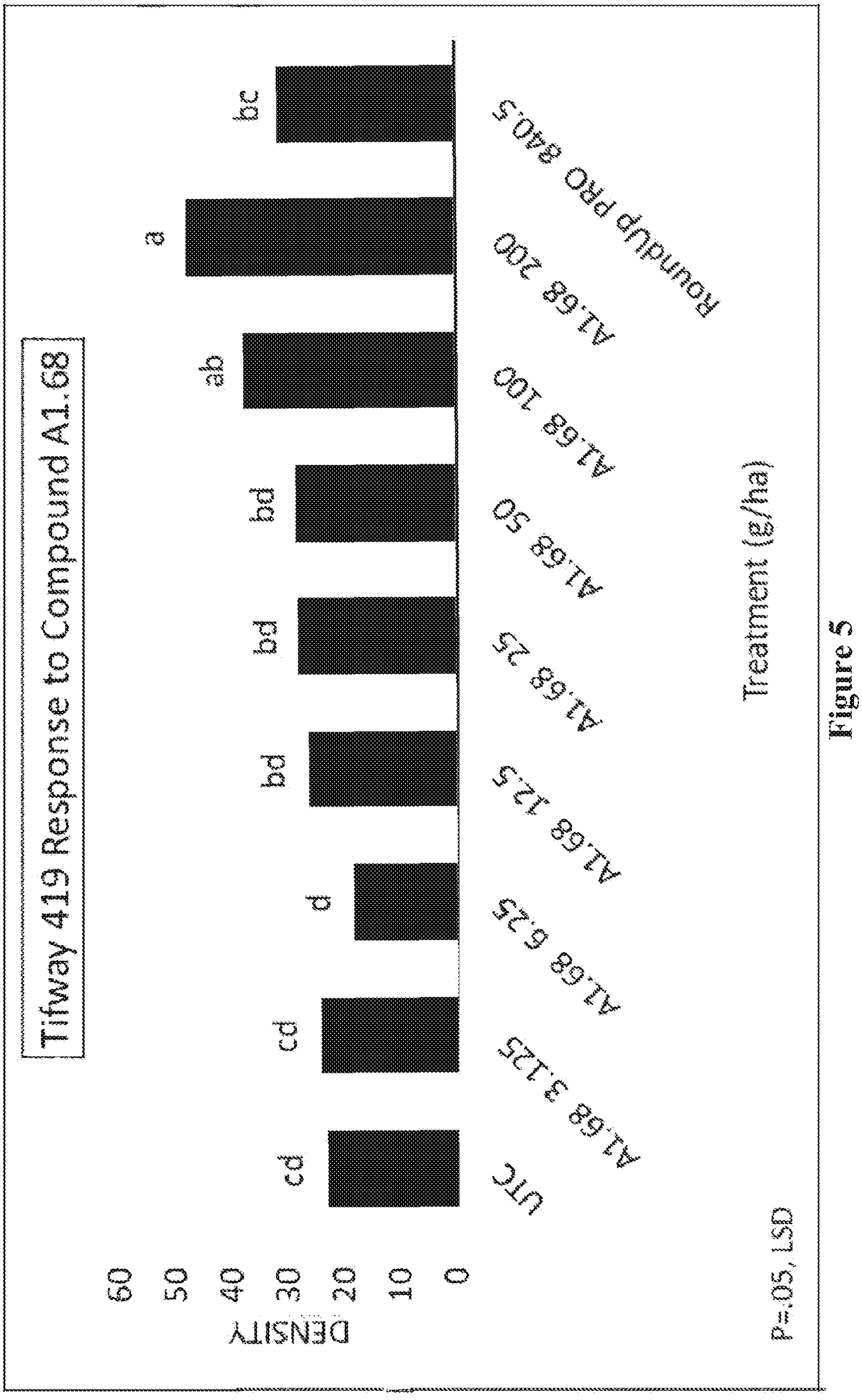

FIG. 5: Turf Density analysis via Digital Image Analysis on Tifway 419 at 28 DAT. An increase in Density vs. the UTC is first observed at 100 g/ha compound A1.68.

Figure 6:
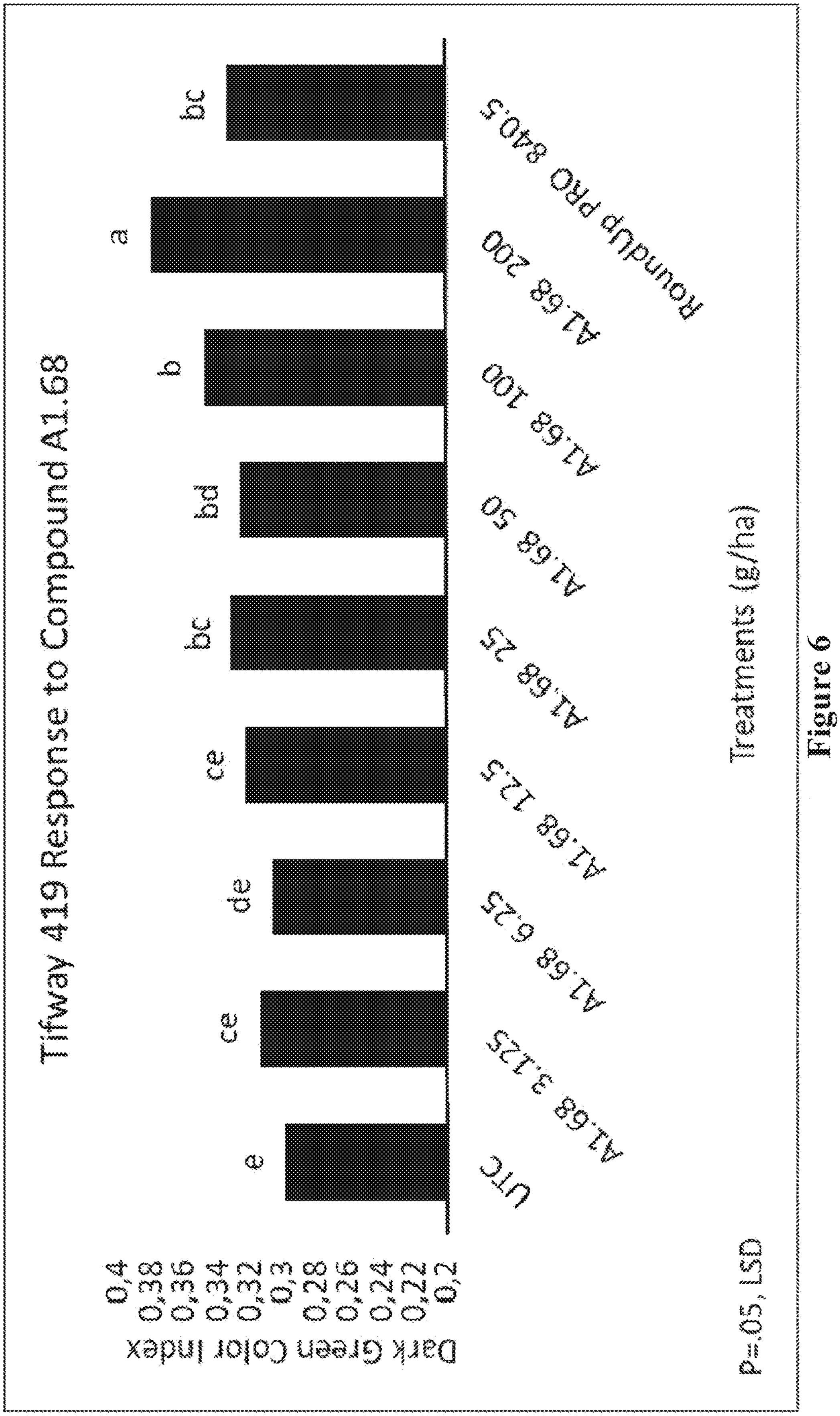

FIG. 6: Dark Green Color Index via Digital Image Analysis on Tifway 419 at 28 DAT. An increase in DGCI vs. the UTC is first observed at 25 g/ha of compound A1.68.

Figure 7:
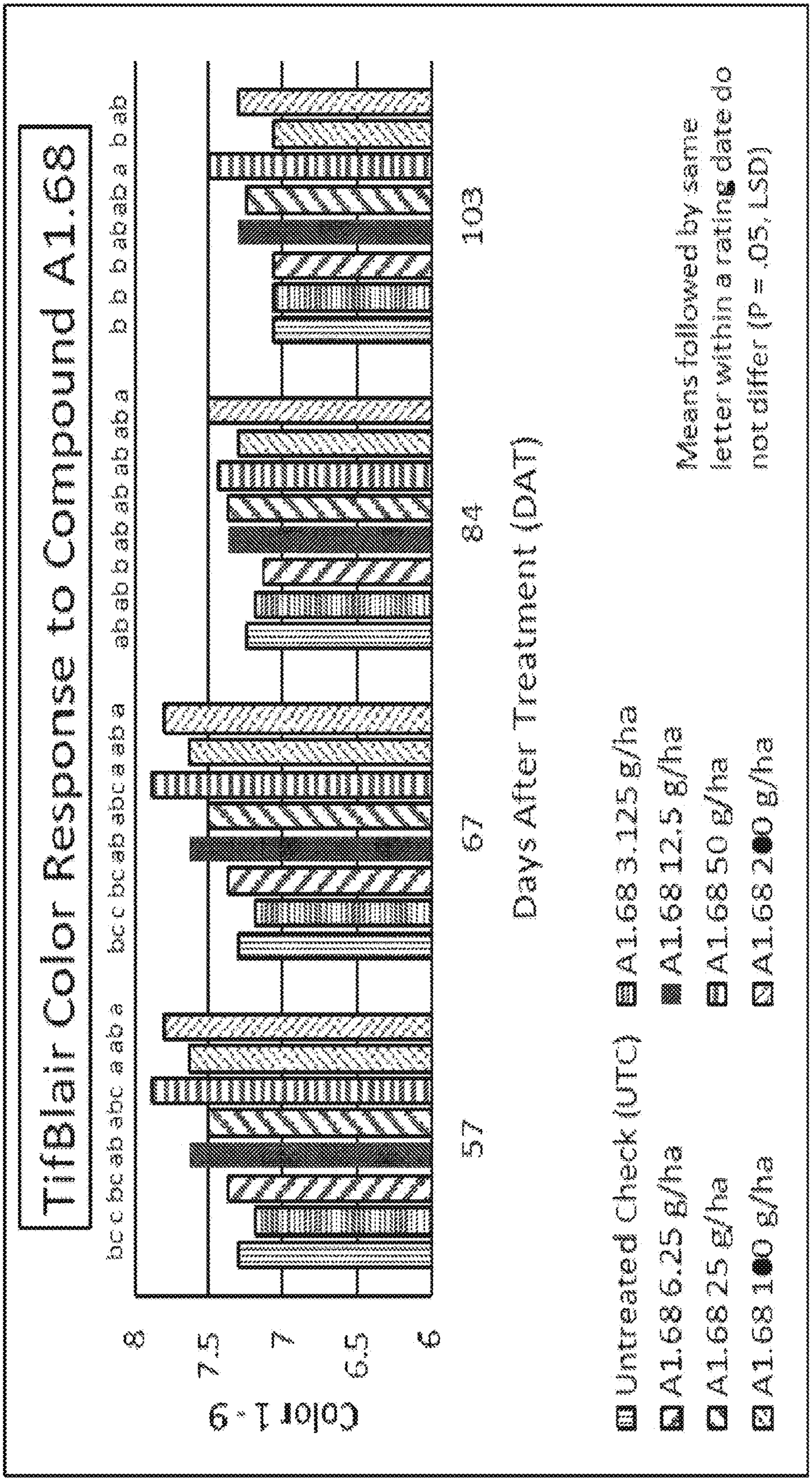

FIG. 7. Color response of centipedegrass cv TifBlair to compound A1.68 rate range over a temporal course. A rate effect was observed.

The present invention relates to the following examples:

EXAMPLE 1

A field trial was initiated in autumn on a fairway. The objective of this research was to determine turfgrass tolerance to herbicides according to the invention. Said fairway was comprised of actively growing bermudagrass cv. 'Tifway 419' (*Cynodon dactylon*×*C. transvaalensis*). The trial was based on a randomized, complete block experimental design with 4 replicates. Compound A1.68 was tested across the rate range of 12.5-200 g/ha. All Treatments included a spray adjuvant as indicated. Each plot measured 1×2 meters for a total individual plot area of 2 $m^2$ with a 0.5 m buffer between lots and replicates. Spray volume was 374 L/ha. Treatments were applied via a single nozzle, $CO_2$ backpack sprayer and equipped with a TeeJet 9504EVS spray tip.

TABLE 1

Treatment List

| Treatment Number | Treatment |
|---|---|
| 1. | UTC |
| 2. | A1.68 12.5 g/ha + 0.25% v/v Nonionic Surfactant (NIS) |
| 3. | A1.68 25.0 g/ha + 0.5% v/v Methylated Seed Oil (MSO) |
| 4. | A1.68 50.0 g/ha + 0.5% v/v MSO |
| 5. | A1.68 100.0 g/ha + 0.5% v/v MSO |
| 6. | A1.68 200.0 g/ha + 0.5% v/v MSO |

Evaluation

All plots were evaluated visually for Turf Quality (9-1 scale, where 9=Excellent plant compatibility, 6=Minimal commercial acceptability and 1=Completely incompatible [Practically kills plant]), Phytotoxicity (% PHYGEN, where the maximum commercially acceptable PHYGEN was defined at 20%), and Turf Cover (%). Ratings were taken at trial initiation/0 Days After Treatment (DAT), 3, 7, 14, 28, 42, and 58 DAT. Besides these structured ratings, the researcher's observations were logged. At 28 DAT (4 Weeks After Treatment [WAT]), the researcher noted a greening effect which was confirmed by a second researcher.

EXAMPLE 2

A field trial was initiated in February on a fairway. The objective of this research was to determine late stage annual bluegrass (*Poa annua*) control from herbicides according to the invention. Said fairway was comprised of dormant bermudagrass cv. 'Tifway 419' (*Cynodon dactylon*×*C. transvaalensis*). The trial was based on a randomized, complete block experimental design with 4 replicates. Compound A1.68 was tested across the rate range of 12.5-200 g/ha. All Treatments included a spray adjuvant. Each plot measured 1×2 meters with a 0.5 m buffer between lots and replicates. Spray volume was 374 L/ha. Treatments were applied via a single nozzle, $CO_2$ backpack sprayer and equipped with a TeeJet 9504EVS spray tip.

TABLE 2

Treatment List for Bayer Trial HE17USAS1AETQ3

| Treatment Number | Treatment |
|---|---|
| 1. | UTC |
| 2. | A1.68 25.0 g/ha + 0.5% v/v Methylated Seed Oil (MSO) |
| 3. | A1.68 50.0 g/ha + 0.5% v/v MSO |
| 4. | A1.68 100.0 g/ha + 0.5% v/v MSO |
| 5. | A1.68 200.0 g/ha + 0.5% v/v MSO |

Evaluation

While the primary objective of this trial was to ascertain the herbicidal effects of compound A1.68 against *Poa annua*, the tolerance of the desirable turfgrass was also rated. Ratings included Turf Color and NDVI. Additionally, digital images were captured.

Turf Color was rated in accordance with NTEP (National Turfgrass Evaluation Program) methodologies. Here, the 1-9 scale is defined as 1=straw brown and 9=deep green. Results are depicted in FIG. 1. The plots were also analyzed using NDVI (Normalized Difference Vegetation Index) radiometry. NDVI is used to determine the relative 'health' of a plant. It is calculated according to the formula, (NIR−Red)/(NIR+Red), where NIR=Near-InfraRed wavelengths and Red=Red wavelengths. Near-infrared radiation is strongly reflected by healthy vegetation whereas red light is strongly absorbed. This phenomenon is perceived by the human eye as the color (hue) green. Results are depicted in FIG. 2.

EXAMPLE 3

A field trial was initiated in June on a field. The objective of this research was to determine turfgrass tolerance to compounds according to the invention. The field was comprised of actively growing bermudagrass cv. 'Tifway 419' (*Cynodon dactylon*×*C. transvaalensis*). The trial was based on a randomized, complete block experimental design with 4 replicates. Compound A1.68 was tested across the rate range of 3.125-200 g/ha. All treatments with compound A1.68 included a Methylated Seed Oil (MSO) spray adjuvant. RoundUp Pro, EPA Registration Number 524-475 (480 g/L glyphosate IPA salt; 356 g/L glyphosate acid), at 840.5 g Glyphosate IPA (isopropylamine) salt/ha (1.5 pints RoundUp Pro/A) was included as a positive control. Each plot measured 1×1 meter with a 0.5 m buffer between lots and replicates. Spray volume was 374 L/ha. Treatments were applied via a single nozzle, $CO_2$ backpack sprayer and equipped with a TeeJet 9504EVS spray tip.

TABLE 3

Treatment List

| Treatment Number | Treatment |
|---|---|
| 1. | UTC |
| 2. | Compound A1.68 3.125 g/ha + 0.5% v/v MSO |
| 3. | Compound A1.68 6.25 g/ha + 0.5% v/v MSO |
| 4. | Compound A1.68 12.5 g/ha + 0.5% v/v MSO |
| 5. | Compound A1.68 25 g/ha + 0.5% v/v MSO |
| 6. | Compound A1.68 50 g/ha + 0.5% v/v MSO |
| 7. | Compound A1.68 100 g/ha + 0.5% v/v MSO |
| 8. | Compound A1.68 200 g/ha + 0.5% v/v MSO |
| 9. | RoundUp Pro 840.5 g ai/ha |

Evaluation:

At 28 DAA, Digital Image Analysis (DIA) (see FIG. 4) suggests rate responses for both canopy color (HUE, Dark Green Color Index [DGCI]) and Canopy Density. In turfgrass systems, HUE (see FIG. 5) tends to correlate best with visual observations[1]. Both HUE and Density are significantly higher than the UTC at 100 or 200 g rates. With DGCI (see FIG. 6), which takes into account saturation and brightness, the rate response is noted beginning at 25 g/ha rate.

EXAMPLE 4

A field trial was initiated in June on a field. The field was comprised of actively growing centipedegrass cv. 'TifBlair' (*Eremochloa ophiuroides*). The trial was based on a randomized, complete block experimental design with 4 replicates. Compound A1.68 was tested across the rate range of 3.125-200 g/ha. All Treatments with compound A1.68 included a Methylated Seed Oil (MSO) spray adjuvant. Each plot measured 1×1 meter with a 0.5 m buffer between plots and replicates. Spray volume was 374 L/ha. Treatments were applied via a single nozzle, $CO_2$ backpack sprayer and equipped with a TeeJet 9504EVS spray tip.

TABLE 4

Treatment List Example 4

| Treatment Number | Treatment |
|---|---|
| 1. | UTC |
| 2. | Compound A1.68 3.125 g/ha + 0.5% v/v MSO |
| 3. | Compound A1.68 6.25 g/ha + 0.5% v/v MSO |
| 4. | Compound A1.68 12.5 g/ha + 0.5% v/v MSO |
| 5. | Compound A1.68 25 g/ha + 0.5% v/v MSO |
| 6. | Compound A1.68 50 g/ha + 0.5% v/v MSO |
| 7. | Compound A1.68 100 g/ha + 0.5% v/v MSO |
| 8. | Compound A1.68 200 g/ha + 0.5% v/v MSO |

Evaluation

All plots were evaluated visually for Turf Quality (9-1 scale, where 9=Excellent plant compatibility, 6=Minimal commercial acceptability and 9=Completely incompatible [Practically kills plant]), Phytotoxicity (% PHYGEN, where the maximum commercially acceptable PHYGEN was defined at 20%), Turf Cover (%), and Turf Color (1-9 scale in accordance with NTEP methodologies, where 1=straw brown and 9=deep green). Only the Turf Color ratings are reported herein. A rate effect was observed (see FIG. 7).

The invention claimed is:

1. A method for treating turf or lawn, the method comprising:

applying to the turf or lawn an effective amount of a composition comprising one or more compounds of formula (I), or salts thereof, wherein the turf or lawn comprises at least one species selected from the group consisting of Bermuda grass, St. Augustine grass, Annual Bluegrass, Centipede grass, Zoysiagrass, (I)

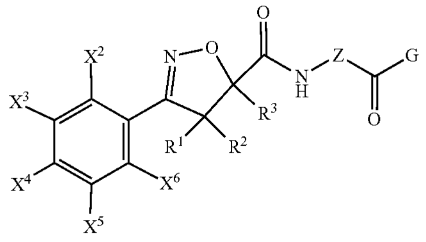

wherein, $R^1$ and $R^2$ each represent hydrogen;

$R^3$ represents $(C_1-C_5)$-alkyl, $(C_3-C_6)$-cycloalkyl, $(C_2-C_5)$-alkenyl, $(C_2-C_5)$-alkynyl or $(C_1-C_5)$-alkoxy each optionally substituted;

G represents $OR^4$, where $R^4$ represents hydrogen, or represents $(C_1-C_{12})$-alkyl, $(C_3-C_7)$-cycloalkyl, $(C_3-C_7)$-cycloalkyl-$(C_1-C_8)$-alkyl, $(C_2-C_8)$-alkenyl, $(C_5-C_6)$-cycloalkenyl, $(C_1-C_4)$-alkylphenyl or $(C_2-C_8)$-alkynyl each optionally substituted;

Z represents a five-membered heterocycle containing an oxygen atom;

$X^2$, $X^4$ and $X^6$ independently of one another represent hydrogen or fluorine;

$X^3$ and $X^5$ independently of one another represent hydrogen, chlorine, cyano or fluorine; or represent $(C_1-C_3)$-Alkyl, $(C_1-C_3)$-Alkoxy each optionally substituted, wherein the composition is applied at a rate of from 25 to 200 g of compound per hectare, and wherein a green color of the turf or lawn is increased or a density of the turf or lawn is improved.

2. The method of claim 1, wherein:

$R^3$ represents $(C_2-C_5)$-alkenyl;

G represents $OR^4$, where $R^4$ represents hydrogen or methyl;

Z represents tetrahydrofuranyl;

$X^2$, $X^4$ and $X^6$ represent hydrogen; and $X^3$ and $X^5$ represent fluorine.

3. The method of claim 1, wherein the one or more compounds of formula (I) are selected from:

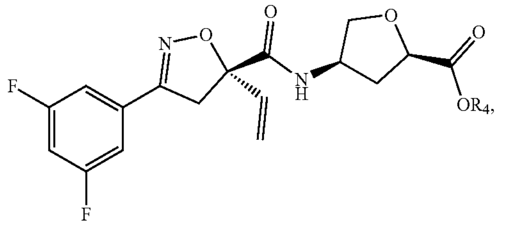

(2R, 4R) isomer

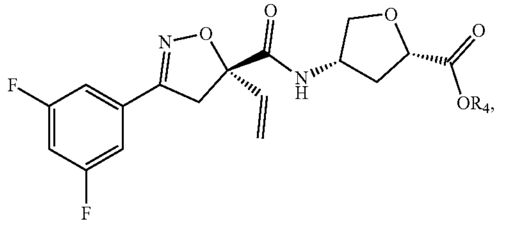

(2S, 4S) isomer and combinations thereof.

4. The method of claim 3, wherein the one or more compounds of formula (I), or salts thereof, contain between 60% and 100% of the (2R, 4R) isomer.

5. The method of claim 3, wherein the one or more compounds of formula (I), or salts thereof, contain between 80% and 100% of the (2R, 4R) isomer.

6. The method of claim 1, wherein $R^4$ represents $(C_1-C_{12})$-alkyl.

7. The method of claim 1, further comprising:

applying the composition comprising one or more compounds of formula (I), or salts thereof, together, before, or after the application of one or more other active ingredients selected from the group consisting of type (B) herbicides useful in the treatment of lawn or turf.

8. The method of claim 7, wherein the type (B) herbicides are selected from the group consisting of:

(B1) 2,4-D and esters and salts thereof,
(B2) Amicarbazone,
(B3) Amidosulfuron or salts thereof,
(B4) Aminocyclopyrachlor or salts or esters thereof,
(B5) Aminopyralid or salts thereof,
(B6) Bentazon,
(B7) Bromoxynil or esters thereof,
(B8) Carfentrazone and esters and salts thereof,
(B9) Chlorosulfuron,
(B10) Dicamba and esters and salts thereof,
(B11) Diflufenican,
(B12) Dimethenamid,
(B13) Dithiopyr,
(B14) Ethofumesate,
(B15) Ethoxysulfuron or salts thereof,
(B16) Flazasulfuron,
(B17) Florpyrauxifen,
(B18) Fluroxypyr or esters thereof,
(B19) Florasulam,
(B20) Foramsulfuron and esters and salts thereof,
(B21) Fatty acids,
(B23) Glufosinate-P (=L-Glufosinate or phosphinothricin) or salts thereof,
(B25) Halauxifene,
(B26) Halosulfuron,
(B27) Indaziflam,
(B28) Iodosulfuron and esters and salts thereof,
(B29) Ipfencarbazone,
(B30) Isoxaflutole,
(B31) Mecoprop and Mecoprop-P, and esters and salts thereof,
(B32) Mesosulfuron and esters or salts thereof,
(B33) Mesotrione,
(B34) Metosulam,
(B35) Metsulfuron and esters and salts thereof,
(B36) Oxadiazon and salts thereof,
(B37) Paraquat and salts thereof,
(B38) Pendimethalin,
(B39) Penoxsulam and salts thereof,
(B40) Picloram and esters and salts thereof,
(B41) Prodiamine,
(B42) Pyrasulfotole and salts thereof,
(B43) Pyrimisulfan,
(B44) Pyroxasulfone (KIH-485) and salts thereof,
(B45) Pyroxsulam and salts thereof,
(B46) Rimsulfuron and salts thereof,
(B47) Saflufenacil and salts thereof,
(B48) *Sclerotinia* (biological herbicides),
(B49) Sulfentrazone and salts thereof,
(B50) Sulfosulfuron,
(B51) SYN-449 and salts thereof,
(B52) SYN-523 and salts thereof,
(B53) Tembotrione and salts thereof,
(B54) Tetflupyrolimet,
(B55) Thiencarbazone and esters and salts thereof,
(B55.2) Thiencarbazone-methyl, (B55.3) Thiencarbazone-methyl-sodium,
(B56) Thifensulfuron and esters and salts thereof,
(B56.2) Thifensulfuron-methyl, (B56.3) Thifensulfuron-methyl-sodium,
(B57) Tiafenacil,
(B58) Topramezone,
(B59) Tribenuron and esters and salts thereof,
(B60) Trifloxysulfuron and salts thereof,
(B60.2) Trifloxysulfuron-sodium,
(B61) Trifludimoxazin,
(B62) MCPA and esters and salts thereof,
(B63) Fenoxaprop and esters and salts thereof,
(B64) Fenoxaprop-P, and esters and salts thereof,
(B65) Triclopyr and esters and salts thereof,
(B66) Metribuzin or salts thereof,
(B67) pronamide, and
(B68) Simazine.

9. The method of claim 1, further comprising

Applying the composition comprising one or more compounds of formula (I), or salts thereof, together, before, or after the application of one or more type (C) active ingredients useful in the treatment of lawn or turf, to weeds, parts of weed plants or an area under cultivation where the plants of the turf or lawn are growing, sown, or to be sown, wherein the type (C) active ingredients are selected from the group consisting of insecticides, acaricides, fungicides, safeners, fertilizers and/or growth regulators or nutrients useful for treating turf or lawn against phytopathogenic diseases or for growth regulation or growth promotion of turf or lawn.

10. The method of claim 1, further comprising applying the composition comprising one or more compounds of formula (I), or salts thereof, to a locus of the turf or lawn plants prior to the planting of the turf or lawn, or during the pre-emergence of undesired vegetation in the turf or lawn.

11. The method of claim 1, further comprising applying the composition comprising one or more compounds of formula (I), or salts thereof, to a locus of weed plants of an established turf or lawn.

12. The method of claim 1, wherein the application rate of the applying is from 0.5 to 500 g of the one or more compounds of formula (I), or salts thereof, per hectare of the turf or lawn.

13. The method of claim 1, wherein the application rate of the applying is from 1 to 250 g of the one or more compounds of formula (I), or salts thereof, per hectare of the turf or lawn.

14. The method of claim 1, wherein the application rate of the applying is from 25 to 200 g of the one or more compounds of formula (I), or salts thereof, per hectare of the turf or lawn.

15. The method of claim 1, wherein the composition further comprises a methylated seed oil (MSO).

16. The method of claim 1, wherein the composition further comprises a safener, wherein the safener is selected from the group consisting of: Benoxacor, Cloquintocet, Cloquintocet-mexyl, Cyometrinil, Cyprosulfamide, Dichlormid, Fenchlorazole, Fenchlorazole-ethyl, Fenclorim, Flurazole, Fluxofenim, Furilazole, Isoxadifen, Isoxadifen-ethyl, Mefenpyr, Mefenpyr-diethyl, Naphthalic anhydride, Oxabetrinil, AD-67 (MON 4660), and TI-35.

17. The method of claim 1, wherein the one or more compounds of formula (I), or salts thereof, improve the quality of the turf or lawn by killing or inhibiting the growth of weeds or undesired vegetation in the turf or lawn.

18. The method of claim 1, further comprising applying the composition comprising one or more compounds of formula (I), or salts thereof, together, before, or after the application of one or more other active ingredients comprising flumioxazin or thiencarbazone-methyl.

19. The method of claim 1, wherein the composition is applied to the locus of the turf or lawn as a sprayable liquid formulation or a granular formulation.

20. A method for treating turf or lawn, the method comprising:

determining an effective amount of a composition comprising one or more compounds of formula (I), or salts thereof, to improve the quality of the turf or lawn, wherein the effective amount of the composition is based on a species of the turf or lawn to be treated, and is determined such that the species is not damaged, (I)

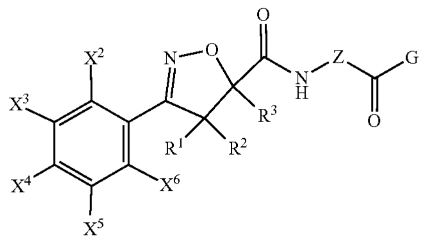

wherein, $R^1$ and $R^2$ each represent hydrogen;

$R^3$ represents $(C_1-C_5)$-alkyl, $(C_3-C_6)$-cycloalkyl, $(C_2-C_5)$-alkenyl, $(C_2-C_5)$-alkynyl or $(C_1-C_5)$-alkoxy each optionally substituted;

G represents $OR^4$, where $R^4$ represents hydrogen, or represents $(C_1-C_{12})$-alkyl, $(C_3-C_7)$-cycloalkyl, $(C_3-C_7)$-cycloalkyl-$(C_1-C_8)$-alkyl, $(C_2-C_8)$-alkenyl, $(C_5-C_6)$-cycloalkenyl, $(C_1-C_4)$-alkylphenyl or $(C_2-C_8)$-alkynyl each optionally substituted;

Z represents a five-membered heterocycle containing an oxygen atom;

$X^2$, $X^4$ and $X^6$ independently of one another represent hydrogen or fluorine;

$X^3$ and $X^5$ independently of one another represent hydrogen, chlorine, cyano or fluorine; or represent $(C_1-C_3)$-Alkyl, $(C_1-C_3)$-Alkoxy each optionally substituted, and applying the effective amount of the composition to the turf or lawn, wherein a green color of the turf or lawn is increased or a density of the turf or lawn is improved.

* * * * *